United States Patent
Horesh

(10) Patent No.: US 10,447,920 B2
(45) Date of Patent: Oct. 15, 2019

(54) MICRO-SACCADIC ACTUATION FOR AN EVENT CAMERA

(71) Applicant: Intel Corporation, Santa Clara, CA (US)

(72) Inventor: Nizan Horesh, Caesarea (IL)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 15/642,033

(22) Filed: Jul. 5, 2017

(65) Prior Publication Data

US 2019/0014258 A1    Jan. 10, 2019

(51) Int. Cl.
*H04N 3/28* (2006.01)
*G06T 7/13* (2017.01)
*H04N 5/232* (2006.01)
*G02B 26/08* (2006.01)
*G02B 13/16* (2006.01)
*G02B 7/36* (2006.01)
*G02B 7/38* (2006.01)

(52) U.S. Cl.
CPC ......... *H04N 5/23219* (2013.01); *G02B 13/16* (2013.01); *G02B 26/0875* (2013.01); *G06T 7/13* (2017.01); *G02B 7/36* (2013.01); *G02B 7/38* (2013.01)

(58) Field of Classification Search
USPC ............. 348/208.11, 206, 207.99, 49, 54, 98
See application file for complete search history.

(56) References Cited

U.S. PATENT DOCUMENTS

| 2006/0018514 | A1* | 1/2006 | Bankhead | G01B 11/303 382/108 |
| 2006/0226346 | A1* | 10/2006 | Bieber | G06F 3/0317 250/221 |
| 2014/0363049 | A1 | 12/2014 | Benosman et al. | |
| 2016/0094800 | A1 | 3/2016 | Gousev et al. | |

FOREIGN PATENT DOCUMENTS

CN    205051792    2/2016

OTHER PUBLICATIONS

Wikipedia, "Optical Flow," Mar. 2, 2017, retrieved from Internet on Apr. 5, 2017, [https://en.wikipedia.org/wiki/Optical_flow], 4 pages.
Yuan et al., "Fast Localization and Tracking using Event Sensors," 2016, 8 pages.

* cited by examiner

*Primary Examiner* — Daquan Zhao
(74) *Attorney, Agent, or Firm* — Hanley, Flight & Zimmerman, LLC

(57) ABSTRACT

Methods, apparatus, systems and articles of manufacture are disclosed relating to micro-saccadic actuation for an event camera. An example event-based imaging device includes a sensor including a pixel array and an optical pathway modulator to move, via a micro-saccadic movement, one or more components of an optical pathway including the sensor to shift incident light on the pixel array to cause a change in light intensity on the pixel in at least one pixel of the pixel array.

12 Claims, 14 Drawing Sheets

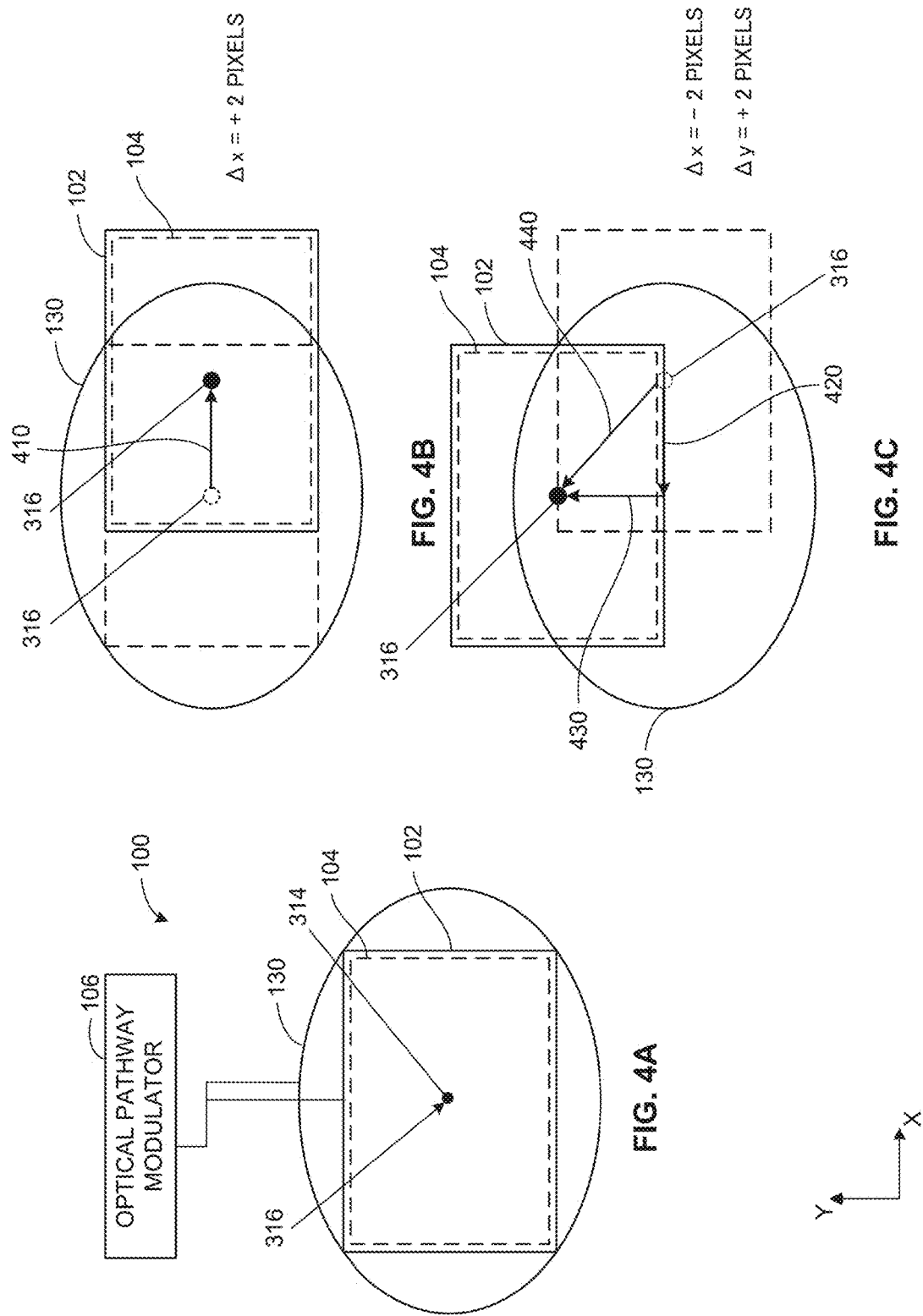

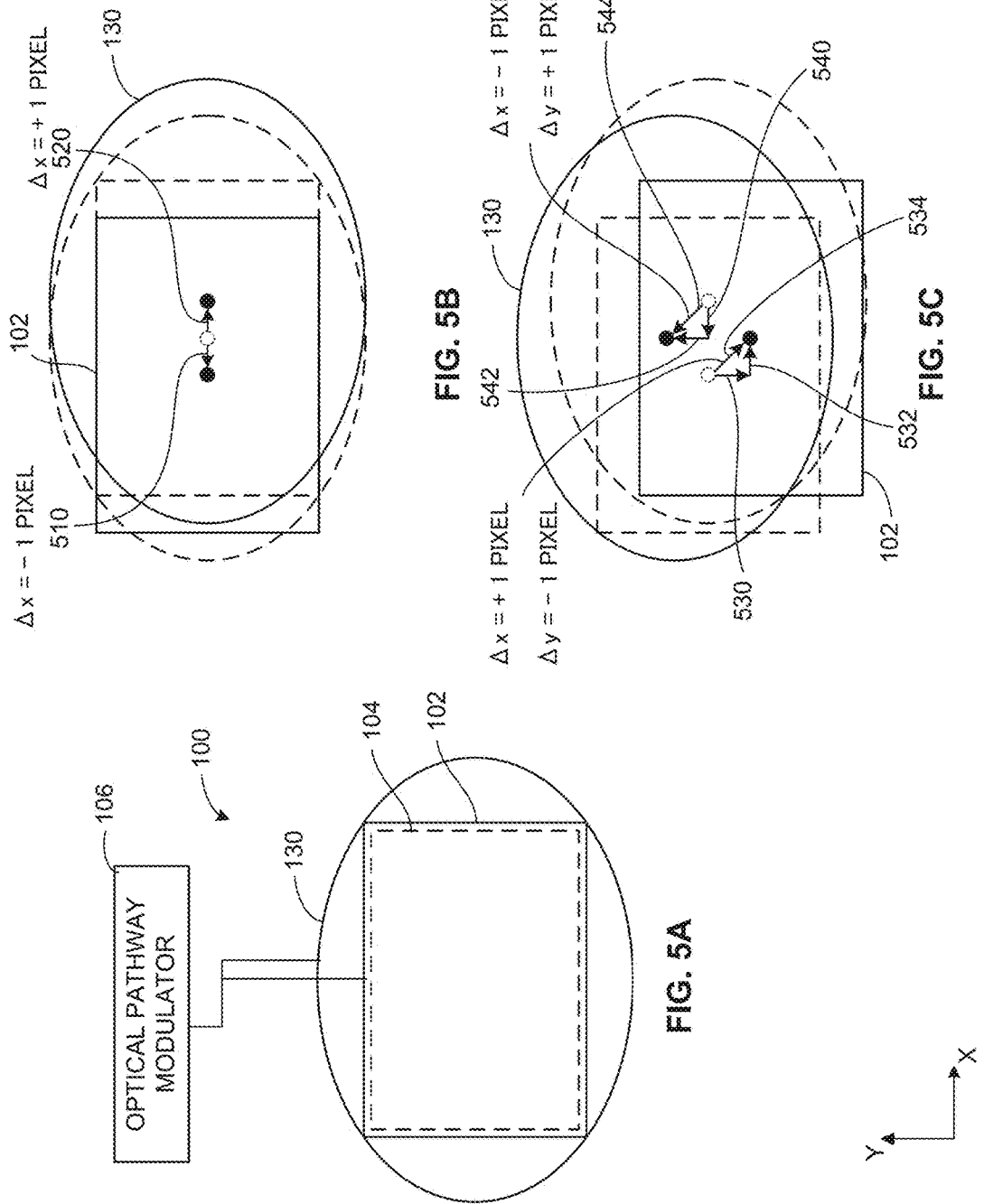

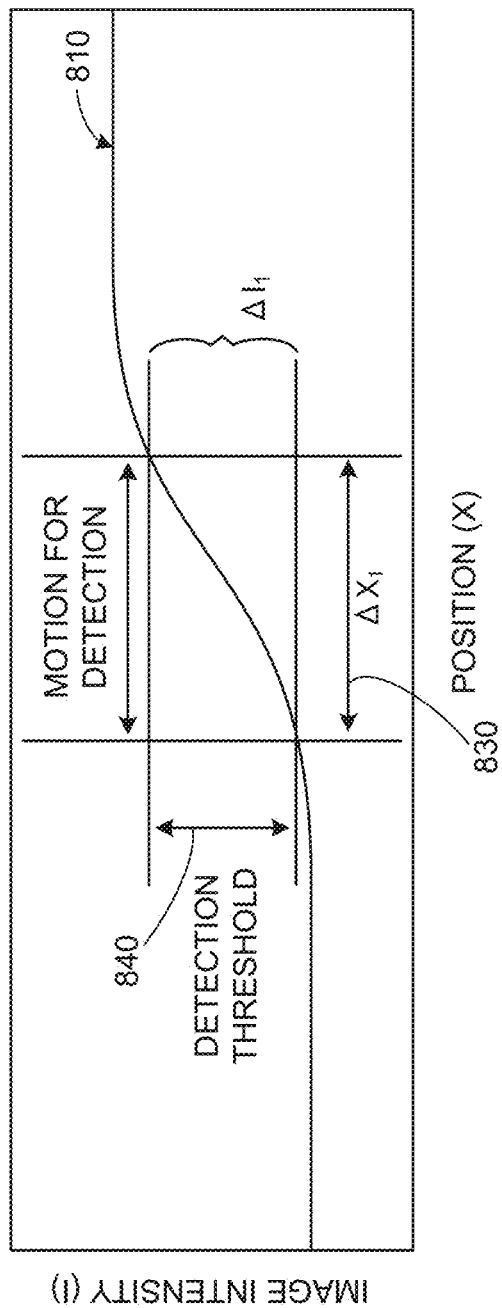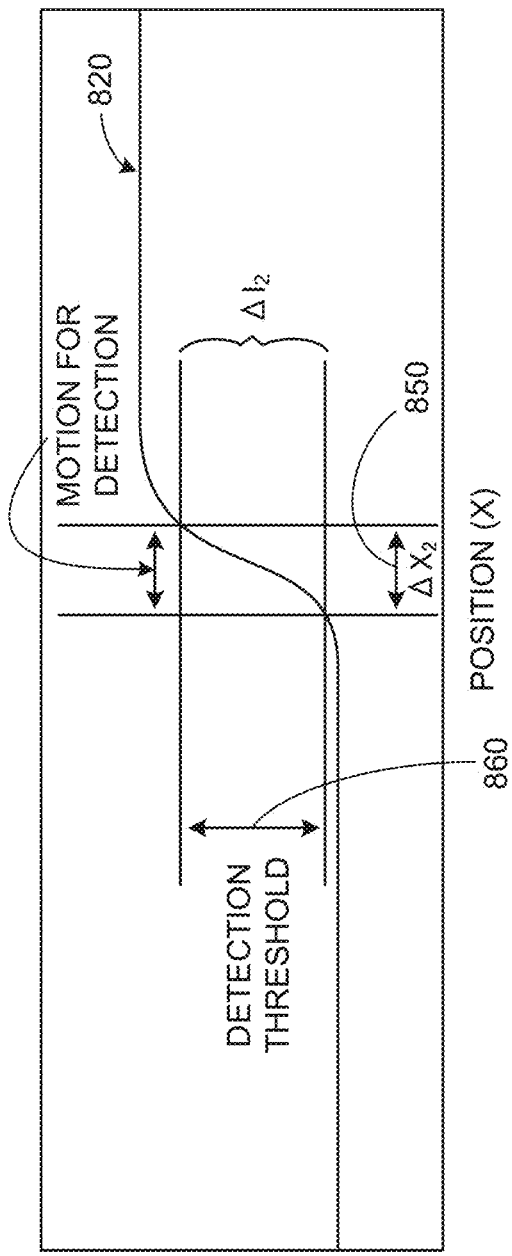

MICRO-SACCADIC ACTUATION FOR AN EVENT CAMERA

FIELD OF THE DISCLOSURE

This disclosure relates generally to imaging systems, and, more particularly, to micro-saccadic actuation for an event camera.

BACKGROUND

In recent years, imaging systems have emerged that use a pixel array to sense temporal changes in contrast and to asynchronously report the temporal changes in contrast together with a time stamp. For instance, a completely static scene produces no temporal changes in contrast for the pixels in the pixel array and none of the pixels reports a temporal change in contrast from a first time to a second time. Accordingly, no report is generated unless there is a change in contrast for the pixel, which reduces power consumption.

BRIEF DESCRIPTION OF THE DRAWINGS

FIGS. 4A-4C illustrate an example implementation of a second example micro-saccadic movement using the first example event-based imaging device of FIG. 1A.

FIGS. 5A-5C illustrate an example implementation of a third example micro-saccadic movement using the first example event-based imaging device of FIG. 1A.

FIGS. 8A-8B illustrate example plots of light intensity on the pixel changes, or changes in light intensity on the pixel, for an example low frequency edge and an example high frequency edge detected by the first example event-based imaging device of FIG. 1A.

The figures are not to scale. Wherever possible, the same reference numbers will be used throughout the drawing(s) and accompanying written description to refer to the same or like parts.

DETAILED DESCRIPTION

As noted above, event-based imaging devices using a pixel array to sense temporal changes in contrast and to asynchronously report the temporal changes in contrast together with a time stamp are known. However, these event-based imaging devices only register changes in contrast and, in a static scene (e.g., a security camera, etc.), the event-based imaging device will not register any features of the scene. The example event-based imaging devices herein can register scene edges that are not registered by known event-based imaging systems, such as by gathering edge information from a static scene, while exploiting the benefits of event camera (e.g., low power, low communication bandwidth, high dynamic range).

Edges that are generated from motion in the scene or motion of the camera will correspond only to changes in the direction of the motion, while edges extracted via the micro-saccadic motion disclosed herein corresponds to changes in any direction to provide full edge information. Extraction of edge information is a starting point of many computer vision algorithms (e.g., motion tracking, image segmentation, etc.). Event cameras register or see temporal events resulting either from motion or from (global) illumination change. The methods and apparatus involving micro-saccadic motion disclosed herein extract spatial edges and may ignore illumination changes.

Figure 1A:
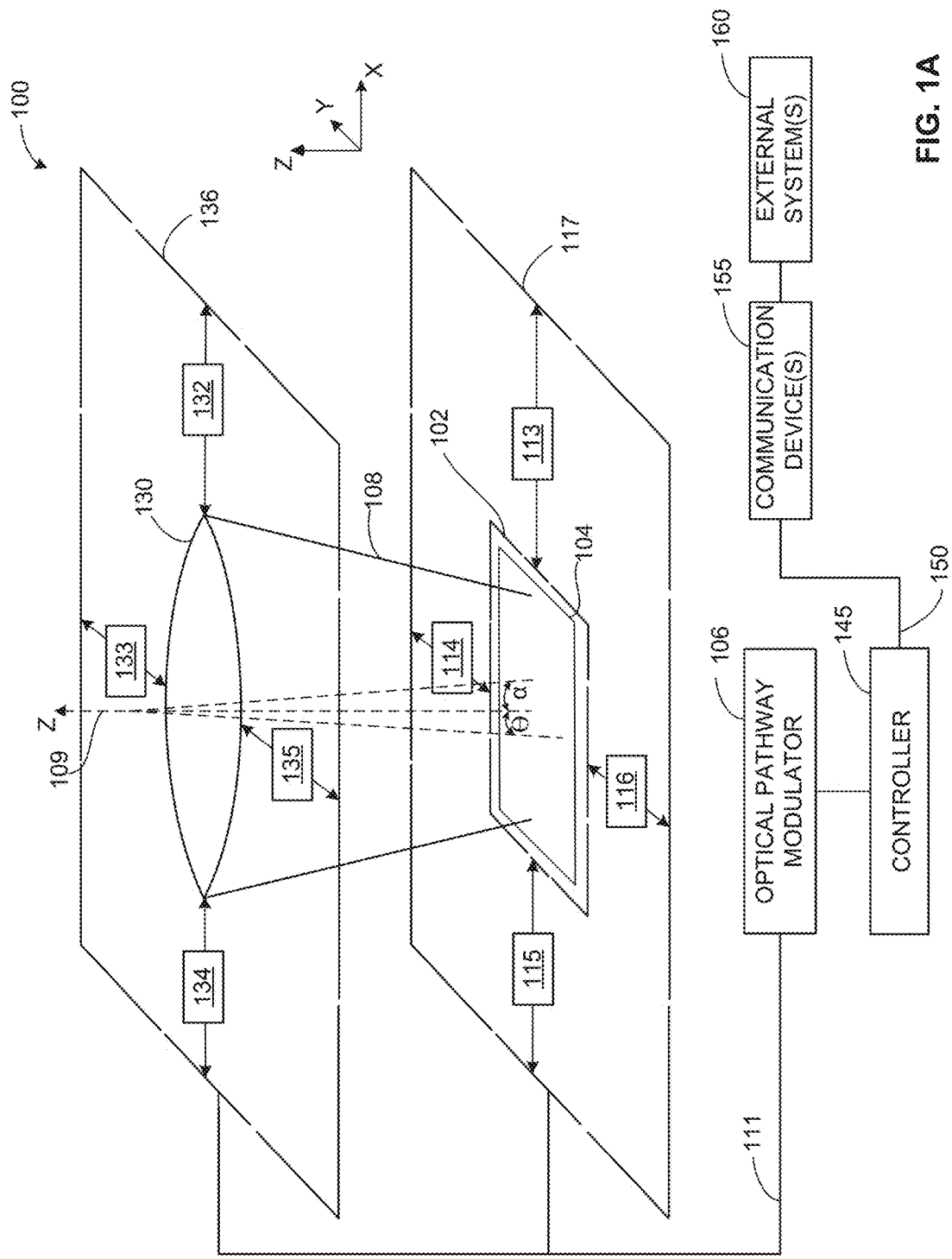
FIG. 1A is a schematic illustration of a first example event-based imaging device in accordance with some teachings of this disclosure.

FIG. 1A is a schematic illustration of a first example event-based imaging device 100 in accordance with some teachings of this disclosure. The first example event-based imaging device 100 includes an example sensor 102 including an example pixel array 104. In some examples, the example sensor 102 is a dynamic vision sensor (DVS) or a dynamic and active-pixel vision sensor (DAVIS). For instance, the example sensor may include the DVS manufactured by iniLabs of Zurich, Switzerland (e.g., DVS128, DAVIS240C, eDVS, Mini eDVS, etc.).

The first example event-based imaging devices 100 includes an example optical pathway modulator 106 to move, via a micro-saccadic movement, one or more components of an example optical pathway 108 including the example sensor 102. The micro-saccadic movement of the one or more components of the example optical pathway 108 shifts light incident on the example pixel array 104 to cause a change in light intensity on the pixel in at least one pixel of the example pixel array 104. The micro-saccadic movement includes a rapid movement from a first position to a second position. Following the rapid movement from the first position to the second position, the component may be maintained in the second position, the component may be moved to another position (e.g., a third position) via another micro-saccadic movement, or the component may be moved to the first position via another micro-saccadic movement. The micro-saccadic movement may include n micro-saccadic movements, where n is any integer, occurring over any period, t. For instance, a micro-saccadic movement may be intermittent (e.g., temporally discontinuous, etc.), periodic (e.g., occurring with a predetermined frequency, etc.), or even continuous, between any two or more points. In some examples, the micro-saccadic movement may be expressed by a component movement profile defined by acceleration vector(s), velocity vector(s), and displacement vector(s) characterizing the movement of the component from the first position to the second position.

In some examples, the micro-saccadic movement of the component(s) of the example optical pathway 108 from the first position to the second position occurs within a time span of about 1-200 milliseconds (ms). For instance, an example movement profile for a component of the example optical pathway 108 (e.g., example sensor 102, example lens 130, etc.) may include an acceleration to a first velocity along a path from the first position to the second position, travel toward the second position at the first velocity, and deceleration of the component to then arrive at the second position occurs within a time span of about 1-200 milliseconds. In another example movement profile, a component may be accelerated from the first position to a midpoint between the first position and the second position, followed by a substantially equal deceleration from the midpoint to the second position.

In some examples, the micro-saccadic movement of the component(s) of the example optical pathway 108 is resolved as an angular displacement (e.g., an angular displacement Θ along a Y-axis, an angular displacement α along an X-axis, etc.) of a center of the component(s) of the example optical pathway 108 relative to an example central axis 109 (e.g., a Z-axis) of the example optical pathway 108. In some examples, a peak angular velocity of the micro-saccadic movement of the component(s) of the example optical pathway 108 is below about 1000°/s. In some examples, the micro-saccadic movement of the component(s) of the example optical pathway 108 is resolved as a linear displacement of a center of a first component of the example optical pathway 108 relative to a second component of the example optical pathway 108. For instance, the micro-saccadic movement may include a rapid movement linear movement of a first example component of the example optical pathway 108 at selected rate and of a selected magnitude (e.g., total distance, such as a distance between 1-100 pixels or a distance between about 5 microns-500 microns, etc.) relative to a second example component of the example optical pathway 108.

In some examples, the micro-saccadic movement includes a movement of the component(s) of the example optical pathway 108 by a selected magnitude in a direction selected from a plurality of available directions. For instance, the micro-saccadic movement may include an angular displacement Θ along the Y-axis or an angular displacement α along the X-axis. By way of example, the angular displacement may be less than about 0.1-5° from the example central axis 109 of the example optical pathway 108. In some examples, the micro-saccadic movement of the component(s) of the example optical pathway 108 includes a plurality of separate movements. For instance, the micro-saccadic movement may include a first displacement of a first magnitude at a first rate in a first direction (e.g., a direction along the X-axis) and a second displacement of a second magnitude at a second rate in a second direction (e.g., a direction along the Y-axis). In some examples, the first magnitude and the second magnitude are equal. In some examples, the micro-saccadic movement may include one or more movements of a randomly selected magnitude within a range of selectable magnitudes and/or a randomly selected direction within a range of selectable directions.

The example optical pathway modulator 106 of FIG. 1A is operatively connected, via a wireless and/or hardwired communication pathway 111, to move one or more components of the example optical pathway 108 via one or more micro-saccadic movements. In FIG. 1A, the example optical pathway modulator 106 is to implement micro-saccadic movement of one or more components of the example optical pathway 108 via an example first actuator 113, an example second actuator 114, an example third actuator 115 and an example fourth actuator 116.

The example first actuator 113, the example second actuator 114, the example third actuator 115 and the example fourth actuator 116 drive a corresponding actuator element (e.g., piston rod, etc.) within an example first plane 117 (e.g., an X-Y plane, etc.). For instance, the example optical pathway modulator 106 is to cause the example first actuator 113 to move the example sensor 102 along a first direction (e.g., along an X-axis) in the example first plane 117 via a first micro-saccadic movement and/or to cause the example second actuator 114 to move the example sensor 102 along a second direction (e.g., along a Y-axis) in the example first plane 117 via a second micro-saccadic movement.

While the example of FIG. 1A depicts four example actuators 113-117, a different number of actuators may be used to impart the micro-saccadic motion described herein. For instance, an example event-based imaging device in accord with the teachings herein may include a plurality of actuators (e.g., two, three, four, etc.) to effect a micro-saccadic movement in a plurality of directions, such as is shown in the example of FIG. 1A, or may include only one actuator to effect a micro-saccadic movement in one or more directions.

The first example event-based imaging device 100 includes, as a component of the example optical pathway 108, an example lens 130. The example lens 130 is operatively connected, via the wireless and/or hardwired communication pathway 111, to the example optical pathway modulator 106. In FIG. 1A, the example optical pathway modulator 106 is to implement one or more micro-saccadic movements of the example lens 130 via an example fifth actuator 132, an example sixth actuator 133, an example seventh actuator 134 and/or an example eighth actuator 135. The example fifth actuator 132, the example sixth actuator 133, the example seventh actuator 134 and the example eighth actuator 135 operate within an example second plane 136 (e.g., an X-Y plane, etc.). For instance, the example optical pathway modulator 106 is to cause the example fifth actuator 132 to implement a micro-saccadic movement of the example lens 130 along a first direction (e.g., along an X-axis) in the example second plane 136 and/or to cause the example sixth actuator 133 to implement a micro-saccadic movement of the example lens 130 along a second direction (e.g., along a Y-axis) in the example second plane 136. While the example of FIG. 1A depicts four example actuators 132-135, a greater number or a lesser number of actuators may be used to impart a micro-saccadic motion to the example lens 130.

The example optical pathway modulator 106 thus drives one or more actuators (e.g., first through fourth actuators 113-116 and/or fifth through eighth actuators 132-135) to implement a micro-saccadic movement of one or more components (e.g., movement of the example sensor 102 and/or the example lens 130) of the example optical pathway 108 relative to one another.

In some examples, the example optical pathway modulator 106 is controlled by an example controller 145, which is communicatively coupled, via a wireless and/or hardwired communication pathway 150, to one or more example communication device(s) 155 and/or example external system(s) 160. In some examples, the example communication device(s) 155 may include a modem, a cellular device, a wireless communication device, a Bluetooth device, a transceiver, a network interface device, or another communication device that may communicate with an example external system 160, such as a computer, a computer network, or an input/output (I/O) device.

Figure 1B:
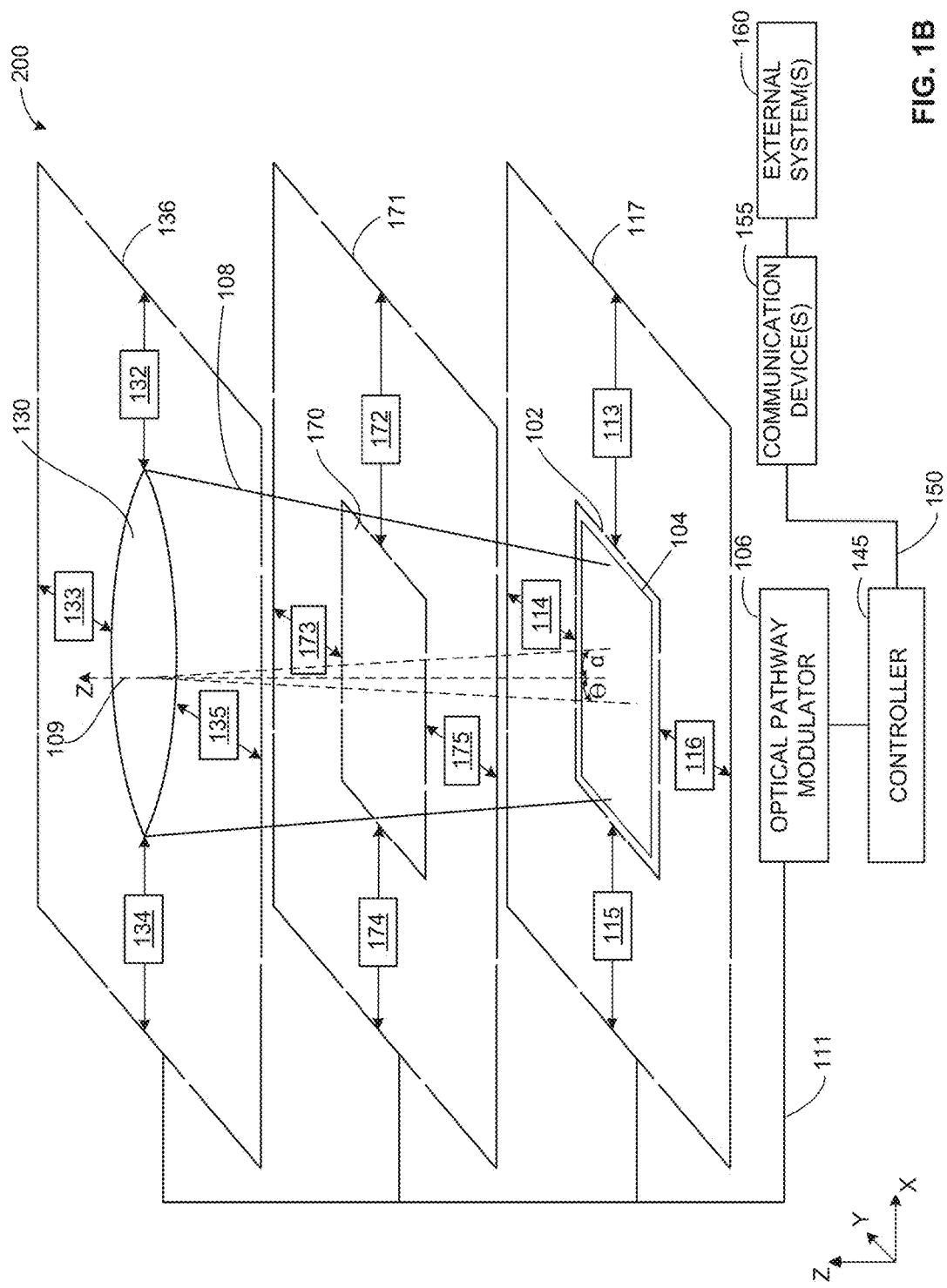
FIG. 1B is a schematic illustration of a second example event-based imaging device in accordance with some teachings of this disclosure.

FIG. 1B is a schematic illustration of a second example event-based imaging device 200 in accordance with some teachings of this disclosure. FIG. 1B is similar to FIG. 1A, but includes another component, an example deflector 170, in the example optical pathway 108 between the example sensor 102 and the example lens 130.

In FIG. 1B, the example optical pathway modulator 106 is to implement a micro-saccadic movement of the example deflector 170 via an example ninth actuator 172, an example tenth actuator 173, an example eleventh actuator 174 and an example twelfth actuator 175. The example ninth actuator 172, the example tenth actuator 173, the example eleventh actuator 174 and the example twelfth actuator 175 drive a corresponding actuator element (e.g., piston rod, etc.) within an example third plane 171 (e.g., an X-Y plane, etc.). For instance, the example optical pathway modulator 106 is to cause the example ninth actuator 172 to implement a micro-saccadic movement of the example deflector 170 along a first direction (e.g., along an X-axis) in the example third plane 171 and/or to cause the example tenth actuator 173 to implement a micro-saccadic movement of the example deflector 170 along a second direction (e.g., along a Y-axis) in the example third plane 171. While the example of FIG. 1B depicts four example actuators 172-175, a different number of actuators may be used to impart the micro-saccadic motion described herein. For instance, an example event-based imaging device in accord with the teachings herein may include a plurality of actuators (e.g., two, three, four, etc.) to effect a micro-saccadic movement in a plurality of directions, such as is shown in the example of FIG. 1B, or may include only one actuator to effect a micro-saccadic movement in one or more directions.

In FIG. 1B, the example optical pathway modulator 106 thus drives one or more actuators (e.g., first through fourth actuators 113-116 and/or fifth through eighth actuators 132-135 and/or ninth through twelfth actuators 172-175) to implement a micro-saccadic movement of one or more components (e.g., movement of the example sensor 102 and/or the example lens 130 and/or the example deflector 170) of the example optical pathway 108 relative to one another.

In some examples, the example deflector 170 includes a beam steering device such as a mirror, a prism, a lens, or a rotating diffraction grating. For instance, the example deflector 170 may include a mechanical mirror-based gimbal, a galvanometer mechanism to rotate a mirror, a Risley prism, phased-array optics, or a microelectromechanical systems (MEMS) using micro-mirrors. In some examples, the example deflector 170 may include a liquid crystal device to change the optical pathway via a change to the refractive index of the medium of the liquid crystal device through which the light of the optical pathway passes.

In some examples, the example first actuator 113, the example second actuator 114, the example third actuator 115, the example fourth actuator 116, the example fifth actuator 132, the example sixth actuator 133, the example seventh actuator 134, the example eighth actuator 135, the example ninth actuator 172, the example tenth actuator 173, the example eleventh actuator 174 and/or the example twelfth actuator 175 may include, for example, a linear actuator, a rotary actuator, an optical image stabilization (OIS) actuator, a smart memory alloy (SMA) OIS actuator, a closed-loop voice-coil (CL-VCS) actuator. In some examples, the example actuators are configured to produce a plurality of micro-saccadic movements (e.g., 5, 10, 15, 20, . . . 100, 105, 110, 115, 120, etc.) per second.

In some examples, the example first actuator 113, the example second actuator 114, the example third actuator 115, the example fourth actuator 116, the example fifth actuator 132, the example sixth actuator 133, the example seventh actuator 134, the example eighth actuator 135, the example ninth actuator 172, the example tenth actuator 173, the example eleventh actuator 174 and/or the example twelfth actuator 175 may be attached directly to a respective one of the example lens 130, the example sensor 102, or the example deflector 170 or may be attached to the example via a housing element for the respective one of the example lens 130, the example sensor 102, or the example deflector 170, or may be attached to one or more intermediary attachment elements or brackets connected thereto. For instance, the example lens 130 may be disposed in a housing and the example fifth actuator 132, the example sixth actuator 133, the example seventh actuator 134, and the example eighth actuator 135 are connected to the housing.

Figure 2:
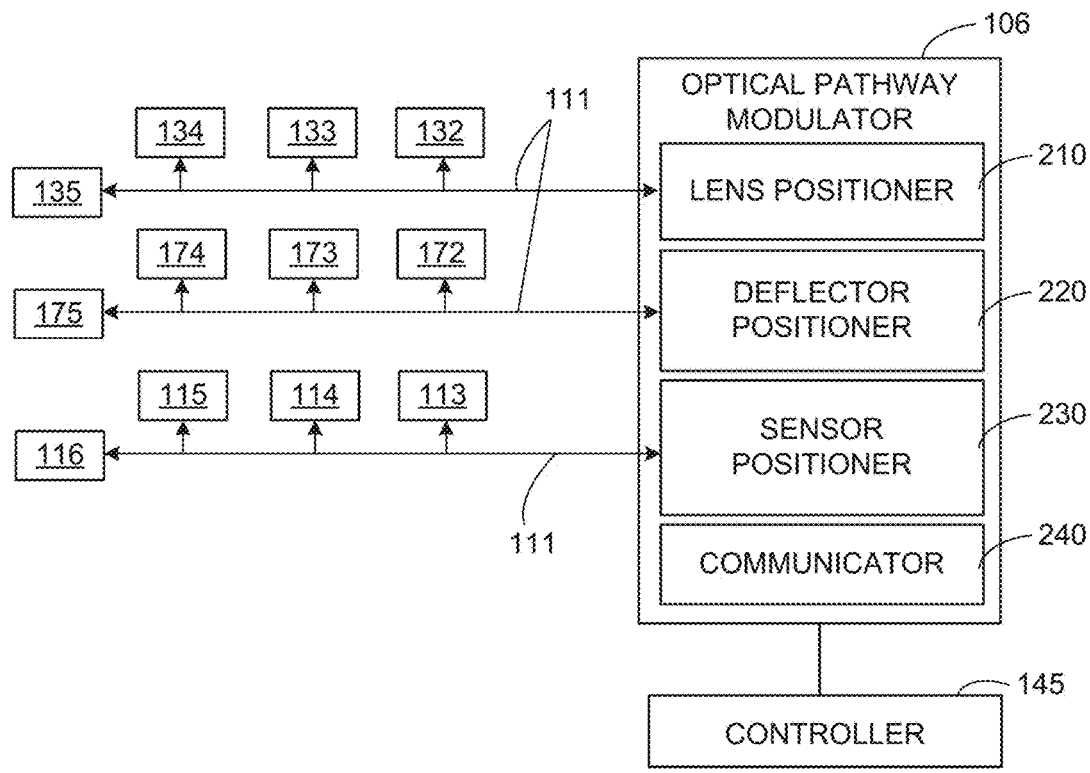
FIG. 2 is a block diagram of an example implementation of the optical pathway modulator of FIGS. 1A-1B.

FIG. 2 is a block diagram of an example implementation of the example optical pathway modulator 106 of FIGS. 1A-1B. The example optical pathway modulator 106 includes an example lens positioner 210, an example deflector positioner 220, an example sensor positioner 230, and an example communicator 240 to communicate with the example controller 145.

The example lens positioner 210 is to cause a predetermined micro-saccadic movement of the example lens 130 via one or more actuators, such as via the example fifth actuator 132, the example sixth actuator 133, the example seventh actuator 134 and/or the example eighth actuator 135.

The example deflector positioner 220 is to cause a predetermined micro-saccadic movement of the example deflector 170 via the example ninth actuator 172, the example tenth actuator 173, the example eleventh actuator 174 and/or the example twelfth actuator 175.

The example sensor positioner 230 is to cause a predetermined micro-saccadic movement of the example sensor 102 via the example first actuator 113, the example second actuator 114, the example third actuator 115 and/or the example fourth actuator 116.

The example communicator 240 is to facilitate communication between the example optical pathway modulator 106 and the example controller 145. In some examples, the example communicator 240 is to facilitate communication between the example optical pathway modulator 106 and the example lens positioner 210, the example deflector positioner 220 and/or the example sensor positioner 230.

While an example manner of implementing the optical pathway modulator of FIGS. 1A-1B is illustrated in FIG. 2, one or more of the elements, processes and/or devices illustrated in FIG. 2 may be combined, divided, re-arranged, omitted, eliminated and/or implemented in any other way. Further, the example lens positioner 210, the example deflector positioner 220, the example sensor positioner 230, the example communicator 240 and/or, more generally, the example optical pathway modulator 106 of FIG. 2 may be implemented by hardware, software, firmware and/or any combination of hardware, software and/or firmware. Thus, for example, any of the example lens positioner 210, the example deflector positioner 220, the example sensor positioner 230, the example communicator 240 and/or, more generally, the example optical pathway modulator 106 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, lens positioner 210, the example deflector positioner 220, the example sensor positioner 230, the example communicator 240 and/or, more generally, the example optical pathway modulator 106 is/are hereby expressly defined to include a non-transitory computer readable storage device or storage disk such as a memory, a digital versatile disk (DVD), a compact disk (CD), a Blu-ray disk, etc. including the software and/or firmware. Further still, the example optical pathway modulator 106 of FIG. 2 may include one or more elements, processes and/or devices in addition to, or instead of, those illustrated in FIG. 4, and/or may include more than one of any or all of the illustrated elements, processes and devices.

Figure 3B:
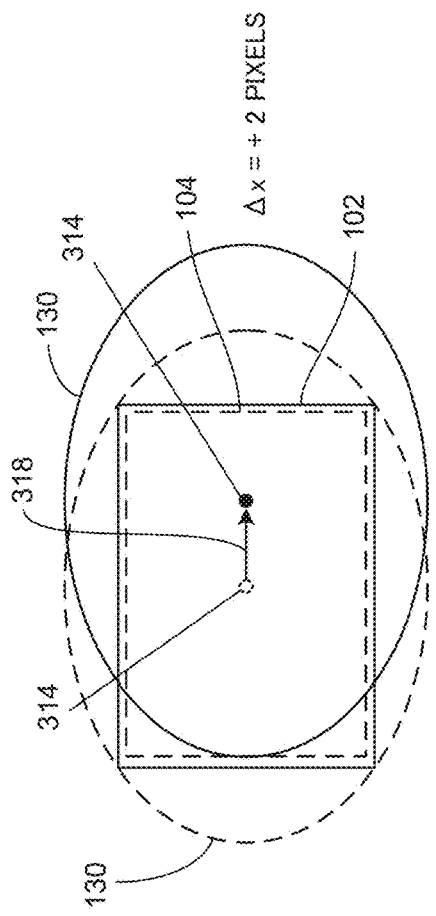
FIGS. 3A-3C illustrate an example implementation of a first example micro-saccadic movement using the first example event-based imaging device of FIG. 1A.
Figure 3C:
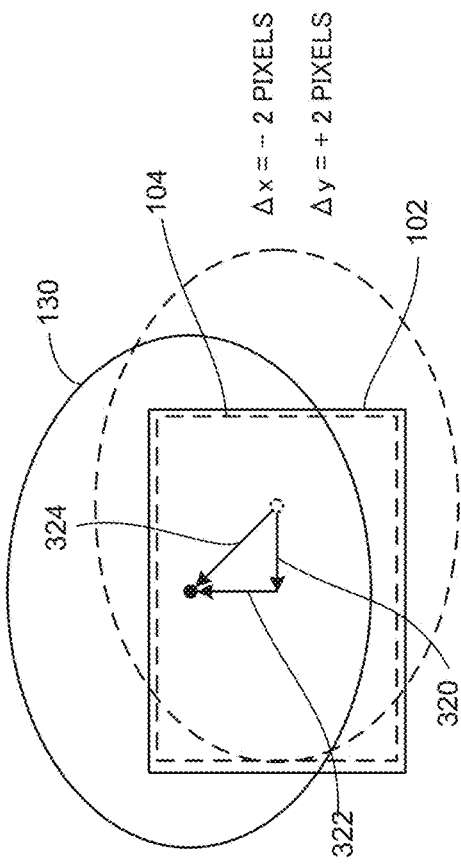
Figure 3A:
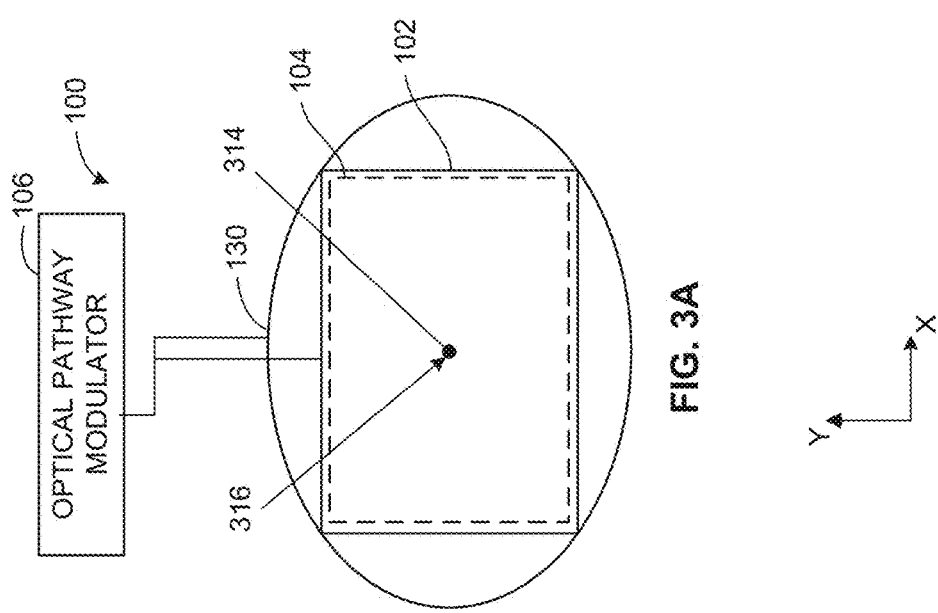

FIGS. 3A-3C illustrate an example implementation of a first example micro-saccadic movement using the first example event-based imaging device 100 of FIG. 1A. FIG. 3A is a top-down view (e.g., along an optical pathway) of an example lens 130 disposed in a first position over an example sensor 102 in a first position. The example sensor 102 includes the example pixel array 104. In the example first position of the example sensor 102 and the example lens 130, a center 314 of the example lens 130 is disposed over a center 316 of the example pixel array 104.

In FIG. 3B, the example lens 130 is displaced along the X-axis via a micro-saccadic movement, along the direction indicated by the arrow 318, by an example distance of +2 pixels (Δx=+2 pixels) relative to a pixel size of the example pixel array 104. The dashed lines for the example lens 130 indicate the example first position of the example lens 130, shown in FIG. 3A and the solid lines for the example lens 130 indicate an example second position of the example lens 130 following an example first micro-saccadic movement of the example lens 130 along the direction indicated by the arrow 318. This example first micro-saccadic movement shifts an incident light on the example pixel array 104 causing a change in light intensity on the pixel at pixels of the example pixel array 104.

In FIG. 3C, the example lens 130 is displaced along the X-axis via a micro-saccadic movement, along the direction indicated by the example arrow 320, by an example distance of −2 pixels (Δx=−2 pixels) relative to the pixel size of the example pixel array 104. The example lens 130 is then displaced via a micro-saccadic movement along the Y-axis in the direction of the example arrow 322, by an example distance of +2 pixels (Δy=+2 pixels). Alternatively, the example lens 130 may be displaced via a micro-saccadic movement along the example arrow 324 or along any other curvilinear or stepwise path between the example second position (FIG. 3B) and the example third position (FIG. 3C) of the example lens 130. The dashed lines for the example lens 130 in FIG. 3C indicate the example second position of the example lens 130, shown in FIG. 3B, and the solid lines for the example lens 130 in FIG. 3C indicate the example third position following the example second micro-saccadic movement of the example lens 130 along the direction indicated by the example arrows 320, 322 or by the example arrow 324. This example second micro-saccadic movement shifts an incident light on the example pixel array 104 causing a change in light intensity on the pixel at pixels of the example pixel array 104.

FIGS. 4A-4C illustrate an example implementation of a second example micro-saccadic movement using the first example event-based imaging device 100 of FIG. 1A. FIG. 4A is a top-down view (e.g., along an optical pathway) of the example lens 130 in the first position disposed over the example sensor 102 in the first position with the center 314 of the example lens 130 being disposed over the center 316 of the example pixel array 104 of the example sensor 102.

In FIG. 4B, the example sensor 102 is displaced via a micro-saccadic movement along the X-axis, along the direction indicated by the arrow 410, by an example distance of +2 pixels (Δx=+2 pixels) relative to the pixel size of the example pixel array 104. The dashed lines for the example sensor 102 indicate the example first position of the example sensor 102, shown in FIG. 4A, and the solid lines for the example sensor 102 indicate an example second position of the example sensor 102 following an example first micro-saccadic movement of the example sensor 102 along the direction indicated by the arrow 410. This example first micro-saccadic movement shifts an incident light on the example pixel array 104 causing a change in light intensity on the pixel at pixels of the example pixel array 104.

In FIG. 4C, the example sensor 102 is displaced via a micro-saccadic movement along the X-axis, along the direction indicated by the example arrow 420, by an example distance of −2 pixels (Δx=−2 pixels). The example sensor 102 is then displaced via a micro-saccadic movement along the Y-axis in the direction of the example arrow 430, by an example distance of +2 pixels (Δy=+2 pixels). Alternatively, the example sensor 102 may be via a micro-saccadic movement displaced along the example arrow 440 or along any other curvilinear or stepwise path between the example second position and the example third position of the example sensor 102. The dashed lines for the example sensor 102 in FIG. 4C indicate the example second position of the example sensor 102, shown in FIG. 4B, and the solid lines for the example sensor 102 indicate the example third position of the example sensor 102 following the example second micro-saccadic movement of the example sensor 102 along the direction indicated by the example arrows 420, 430 or by the example arrow 440. This example second micro-saccadic movement shifts an incident light on the example pixel array 104 causing a change in light intensity on the pixel at pixels of the example pixel array 104.

FIGS. 5A-5C illustrate an example implementation of a third example micro-saccadic movement using the first example event-based imaging device 100 of FIG. 1A. The example of FIGS. 5A-5C illustrates an example wherein the example optical pathway modulator 106 moves, via a micro-saccadic movement, both the example sensor 102 and the example lens 130 of the example optical pathway 108 illustrated in the example of FIG. 1A. FIG. 5A illustrates, as FIGS. 3A and 4A, a top-down view (e.g., along an optical pathway) of the example lens 130 in the first position disposed over the example sensor 102 and the example pixel array 104 in the second position with the center 314 of the example lens 130 being aligned with the center 316 of the example pixel array 104.

In FIG. 5B, the example sensor 102 is displaced via a micro-saccadic movement along the X-axis, along the direction indicated by the arrow 510, by an example distance of −1 pixel (Δx=−1 pixel). The dashed lines for the example sensor 102 indicate the example first position of the example sensor 102, shown in FIG. 5A and the solid lines for the example sensor 102 indicate an example second position of the example sensor 102 following an example first micro-saccadic movement of the example sensor 102 along the direction indicated by the arrow 510. Contemporaneously, the example lens 130 is displaced via a micro-saccadic movement along the X-axis, along the direction indicated by the example arrow 520, by an example distance of +1 pixel ($\Delta x=-1$ pixel) from the first position of the example lens 130 to a second position of the example lens 130. This combination of example micro-saccadic movements shifts an incident light on the example pixel array 104 causing a change in light intensity on the pixel at pixels of the example pixel array 104.

In FIG. 5C, the example sensor 102 is displaced via a micro-saccadic movement along the Y-axis, along the direction indicated by the example arrow 530, by an example distance of −1 pixel ($\Delta y=-1$ pixel). The example sensor 102 is then displaced via a micro-saccadic movement along the X-axis in the direction of the example arrow 532, by an example distance of +1 pixel ($\Delta x=+1$ pixel), from the second position of the example sensor 102 to a third position of the example sensor 102. At or about the same time, the example lens 130 is displaced via a micro-saccadic movement along the X-axis, along the direction indicated by the example arrow 540, by an example distance of −1 pixel ($\Delta x=-1$ pixel) from the second position of the example lens 130 to a third position of the example lens 130. Alternatively, the example sensor 102 may be displaced via a micro-saccadic movement along the example arrow 534 or another curvilinear or stepwise path between the example second position and the example third position of the example sensor 102. The example lens 130 is then displaced via a micro-saccadic movement along the Y-axis in the direction of the example arrow 542, by an example distance of +1 pixel ($\Delta y=+1$ pixel) to arrive at the example third position. Alternatively, the example lens 130 may be via a micro-saccadic movement displaced along the example arrow 544 or another curvilinear or stepwise path between the example second position and the example third position of the example lens 130.

Figure 6A:
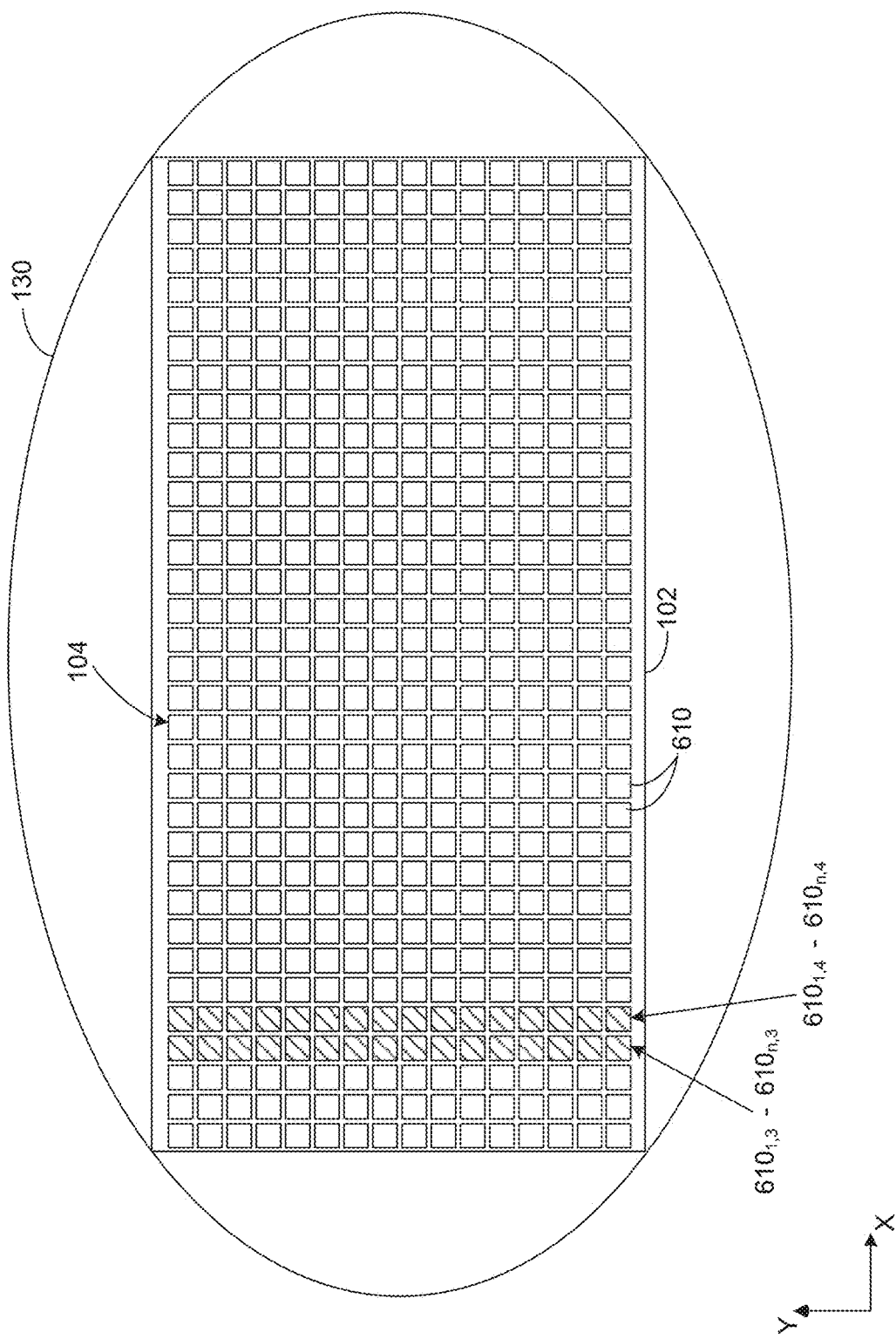
FIGS. 6A-6C illustrate an expanded view of the first example micro-saccadic movement corresponding to FIGS. 3A-3B.
Figure 6B:
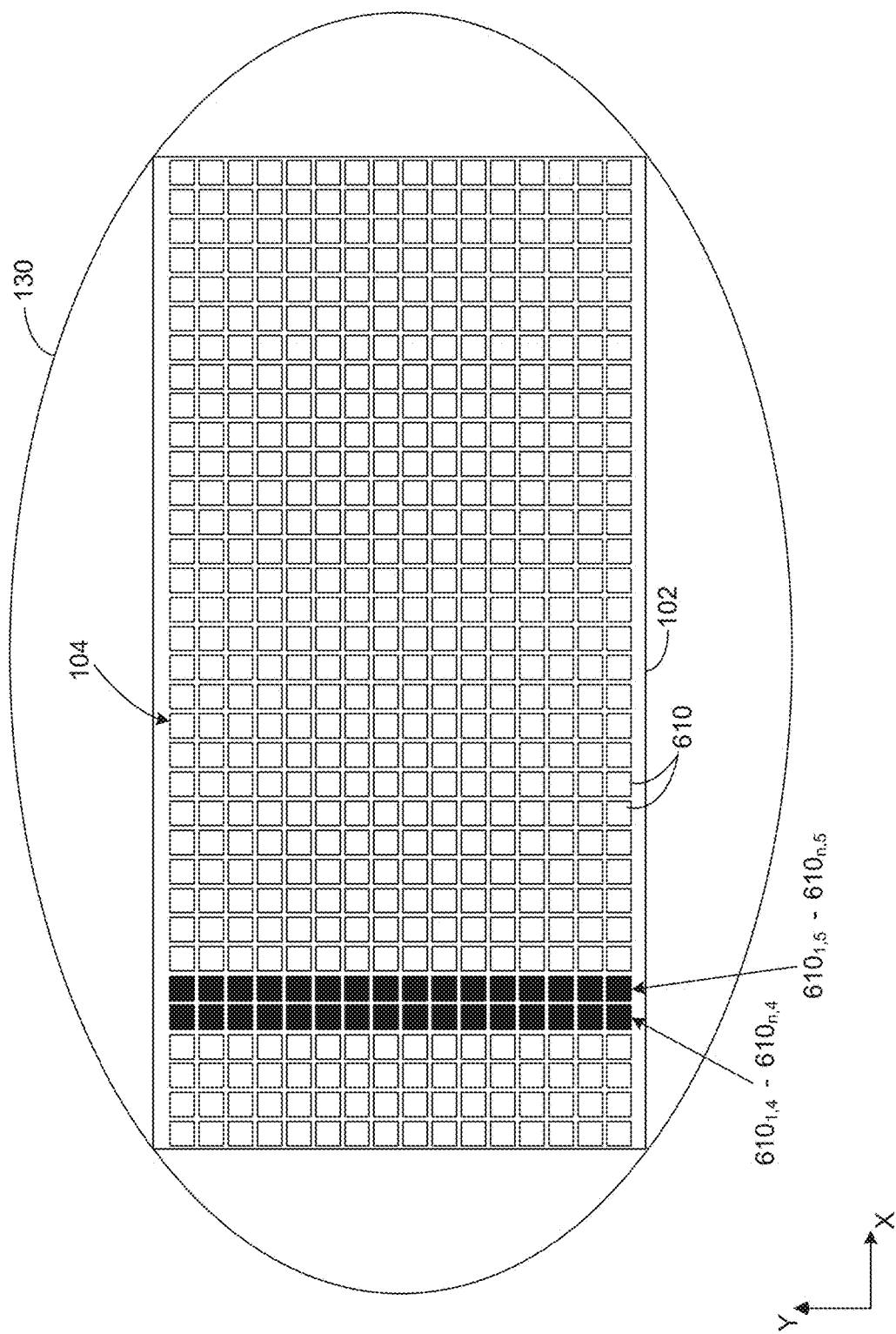
Figure 6C:
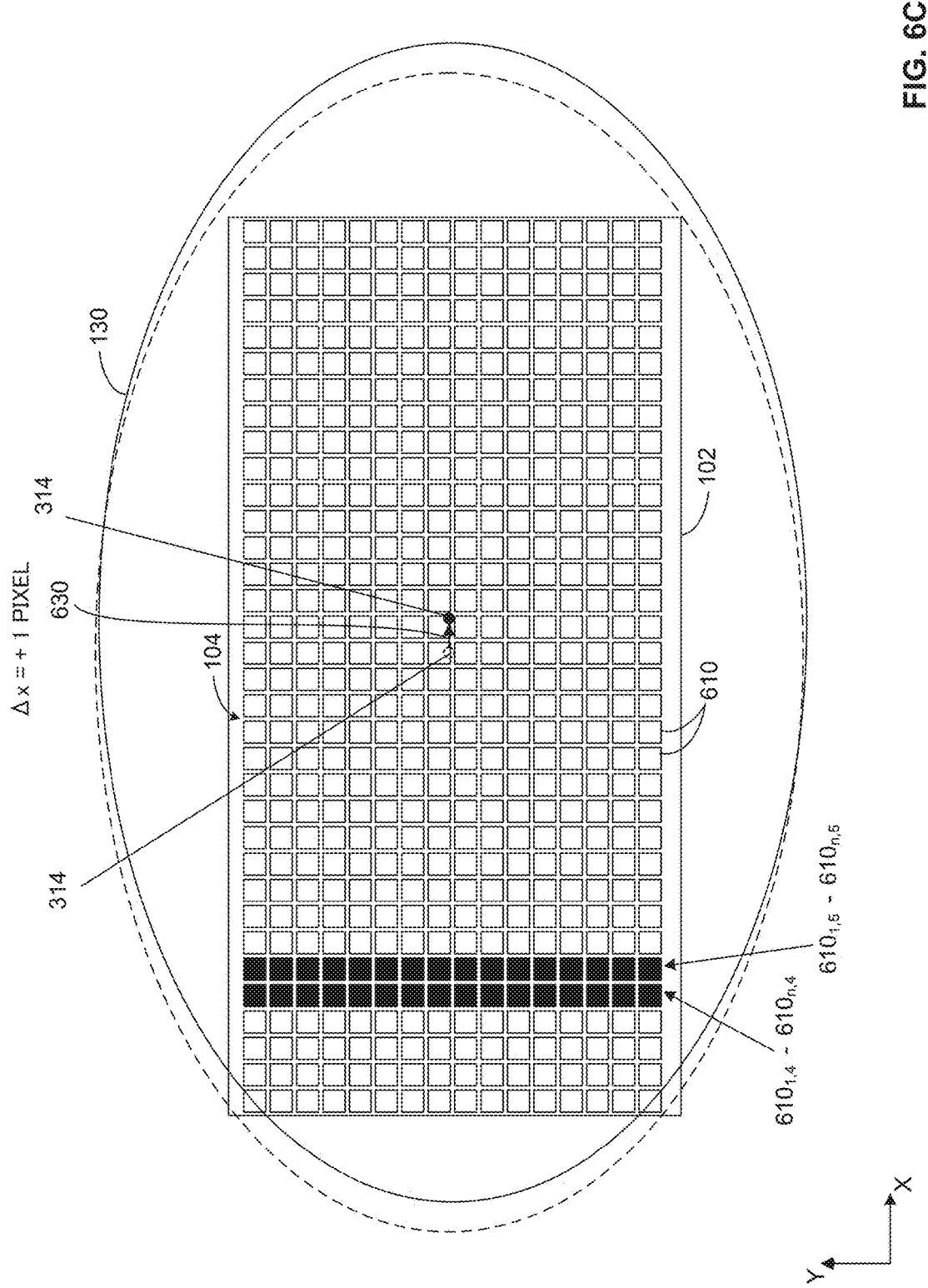

FIGS. 6A-6C illustrate an expanded view of the first example micro-saccadic movement corresponding to FIGS. 3A-3B. FIG. 6A is a top-down view (e.g., along an optical pathway) of the example lens 130 in the first position disposed over the example sensor 102 in the first position. Within the example pixel array 104 are individually addressed pixels 610 in example rows (i) and example columns (j), with each pixel being designated by a row number and a column number (i.e., $610_{i,j}$). FIG. 6A shows an example wherein the example pixels $610_{1,3}$-$610_{n,3}$ (n being an integer) in the third column and the example pixels $610_{1,4}$-$610_{n,4}$ in the fourth column register, at a first moment in time, $t_0$, correspond to an edge boundary of a scene. Since the scene is static at time $t_0$, there is no change in light intensity on the pixel at the example pixels $610_{1,3}$-$610_{n,3}$ and the example pixels $610_{1,4}$-$610_{n,4}$ in the first example event-based imaging device 100. If the edge boundary of the scene moves toward the right ($\Delta x=+1$ pixel) at time $t_1$ with the example sensor 102 and the example lens 130 remaining stationary, as is shown in FIG. 6B, the example pixels $610_{1,4}$-$610_{n,4}$ in the fourth column and the example pixels $610_{1,5}$-$610_{n,5}$ in the fifth column experience a change in contrast and the example sensor 102 asynchronously outputs the change in light intensity on the pixel correlated to a time of the change in light intensity on the pixel (i.e., $t_1$ in this example) corresponding to the resolved feature of the scene.

In the example of FIG. 6C, the scene is static at time $t_1$ and the example lens 130 is displaced to the right ($\Delta x=+1$ pixel) in the direction of arrow 630 at time $t_1$ via the example optical pathway modulator 106 and the example fifth actuator 132 and/or the example seventh actuator 134 of FIG. 1A. The displacement of the example lens 130 causes a change in contrast in pixels in the example pixel array 104 (e.g., the example pixels $610_{1,4}$-$610_{n,4}$ in the fourth column and the example pixels $610_{1,5}$-$610_{n,5}$, as shown) corresponding to features of the scene. The example sensor 102 then outputs (e.g., asynchronously outputs, etc.) the change in light intensity on the pixel correlated to a time of the change in light intensity on the pixel (i.e., $t_1$ in this example) corresponding to the resolved feature of the scene. Thus, even when the scene itself is static, the first example event-based imaging device 100 causes features to be resolved.

In some examples, the example event-based imaging devices 100, 200, 300, via the example optical pathway modulator 106, the example controller 145, and/or the example external system(s) 160, may produce gradient information (the intensity difference between the pixel and a neighbor pixel) in the neighborhood of the image edge. Further processing can be applied to the event information in order to achieve better edge detection. For instance, non-maximal suppression and hysteresis thresholding can be applied, such as in a Canny edge detector. Furthermore, corner detection algorithms may be applied to the gradient information, such as in a Harris corner detector or a Shi-Tomasi detector.

Figure 7:
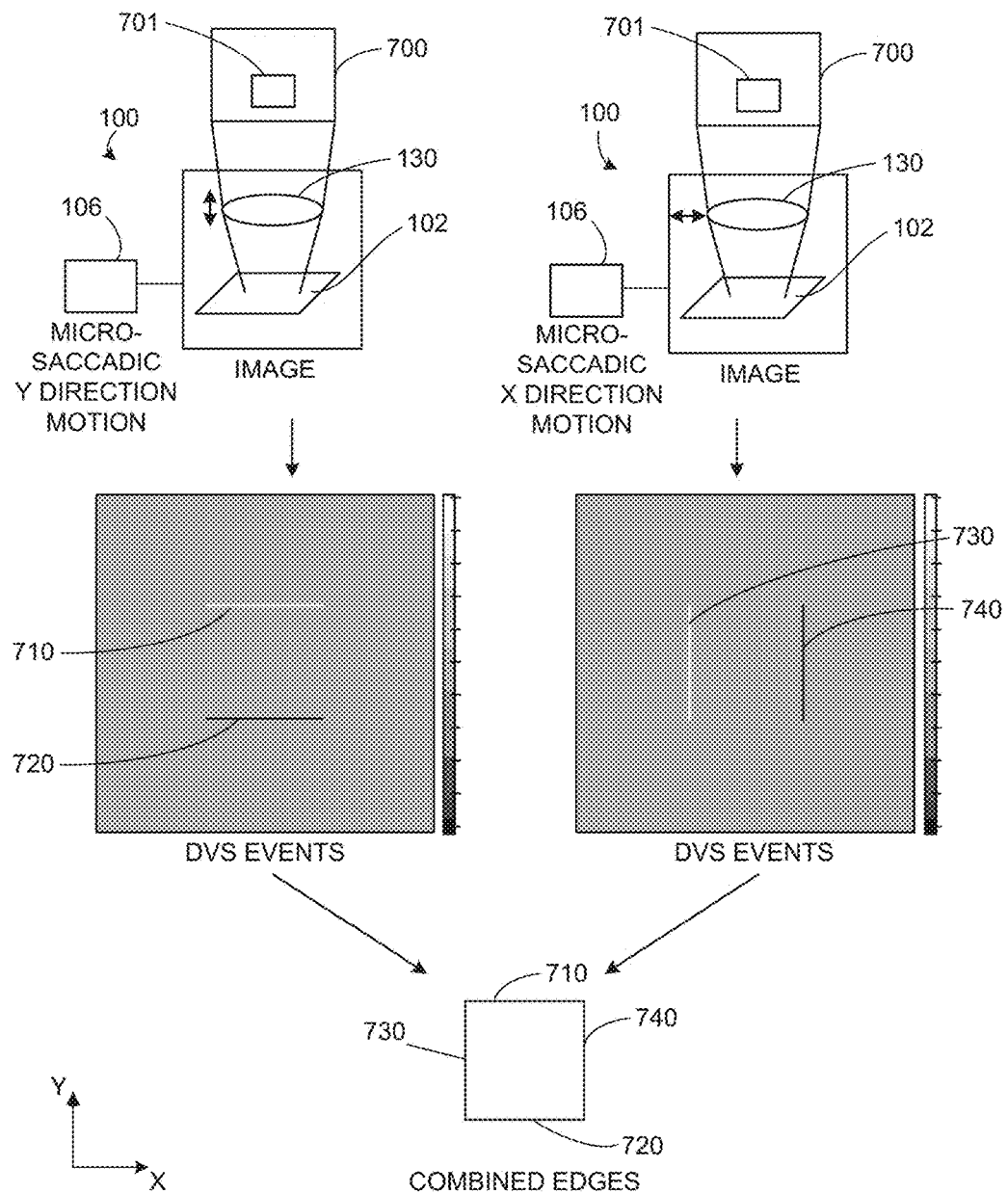
FIG. 7 illustrates an example implementation of a fifth example micro-saccadic movement using the first example event-based imaging device of FIG. 1A.

FIG. 7 illustrates an example implementation of a fifth example micro-saccadic movement using the first example event-based imaging device 100 of FIG. 1A. In FIG. 7, the first example event-based imaging device 100 is imaging an example scene 700 including an object 701. In the example of FIG. 1A and FIG. 7, the example optical pathway modulator 106 is able to control a direction of micro-saccadic movement of the example lens 130 via the example fifth actuator 132, the example sixth actuator 133, the example seventh actuator 134 and/or the example eighth actuator 135 to detect features (e.g., edges, etc.) in different directions and/or to control a direction of micro-saccadic movement of the example sensor 102 via the example first actuator 113, the example second actuator 114, the example third actuator 115 and/or the example fourth actuator 116 to detect features (e.g., edges, etc.) of the example object 701 along different directions.

In some examples, micro-saccadic movement in two directions (e.g., X-axis and Y-axis) is sufficient to resolve all of the features in an example scene 700 (e.g., edges of example objects 701 in the example scene 700). An event is triggered if a relative intensity change ($\Delta I$) sensed at a pixel (x, y) of the example sensor 102 responsive to a micro-saccadic motion exceeds an example predetermined threshold. In some examples, these events are time-stamped and asynchronously transmitted as they occur. On the left side of FIG. 7, the example optical pathway modulator 106 moves the example lens 130 via a micro-saccadic movement in the Y-direction to detect features (e.g., edges, etc.) in the X-direction, which register on the example sensor 102 as a first event corresponding to a first edge 710 of the example object 701 and a second event corresponding to a second edge 720 of the example object 701. On the right side of FIG. 7, the example optical pathway modulator 106 moves the example lens 130 via a micro-saccadic movement in the X-direction to detect features (e.g., edges, etc.) in the Y-direction, which register on the example sensor 102 as a third event corresponding to a third edge 730 of the example object 701 and a fourth event corresponding to a fourth edge 740 of the example object 701. The example first edge 710 and the example second edge 720 resolved a first time and the example third edge 730 and the example fourth edge 740 resolved at a second time are then spatially and temporally juxtaposed by the example controller 145 or by the example external system 160 of FIG. 1A to resolve the example object 701 corresponding to the disparately sensed edges.

FIGS. 8A-8B show an example first plot 810 and an example second plot 820 of image intensity (I) for an example pixel (x, y) of the example sensor 102 in relation to differing degrees of micro-saccadic movement of a component of the optical pathway (e.g., example lens 130 and/or example sensor 102 in FIG. 1A) along an X-direction. FIG. 8A shows an example first micro-saccadic movement 830 having an example magnitude of about $\Delta X_1$ and yielding a first intensity change 840 ($\Delta I_1$) satisfying an example detection threshold. The satisfying of the example detection threshold triggers a registration of the event, a time-stamping of the event, and a transmission of the event to the example optical pathway modulator 106. FIG. 8B shows an example second micro-saccadic movement 850 having an example magnitude of about $\Delta X_2$ and yielding an example second intensity change 860 ($\Delta I_2$) satisfying an example detection threshold. The satisfying of the detection threshold triggers a registration of the event, a time-stamping of the event, and a transmission of the event to the example optical pathway modulator 106.

In FIG. 8A, the example first micro-saccadic movement 830 ($\Delta X_1$) is to resolve a low frequency feature (e.g., wide edge, etc.), whereas the example second micro-saccadic movement 830 ($\Delta X_2$) of FIG. 8B is to resolve a high frequency feature (e.g. thin edge, sharp peak, corner, etc.). In some examples, the second intensity change 860 ($\Delta I_2$) is the same as the first intensity change 840 ($\Delta I_1$). In some examples, the example micro-saccadic movements of the component(s) of the optical pathway (e.g., the example sensor 102 and/or the example lens 130 of FIG. 1A, etc.) may include a plurality of movements of different magnitudes along a same direction. For instance, using the example of FIGS. 6A-6C, a plurality of micro-saccadic movements may be implemented to distinguish high frequency features from low frequency features in a scene, such as by a first micro-saccadic movement of a first magnitude (e.g., $\Delta x=+1$ pixel in FIG. 6C), with a return to the initial position, followed by a second micro-saccadic movement of a second magnitude (e.g., $\Delta x=+10$ pixels, etc.).

In some examples, the spatial frequency information is used to auto-focus the components of the example optical pathway. Using FIG. 1A as an example event-based imaging device 100, an example first set of intensity readings is taken for an example first set of micro-saccadic movements in the X-direction and the Y-direction. Second, edge extraction is performed on the extracted edges from the scene and a first focus score is determined (e.g., summing a number of edges, summing a length of edges, etc.). An example second set of intensity readings is then taken for an example second set of micro-saccadic movements in the X-direction and the Y-direction, edge extraction is performed on the extracted edges from the scene, and a second focus score is determined (e.g., summing a number of edges, summing a length of edges, etc.). This process continues, with variations to the micro-saccadic movements to distinguish high frequency and low frequency edges, such variations to the micro-saccadic movements yielding different focus scores from which a maximum focus score (e.g., a maximum number of resolved edges, etc.) may be determined.

Figure 9A:
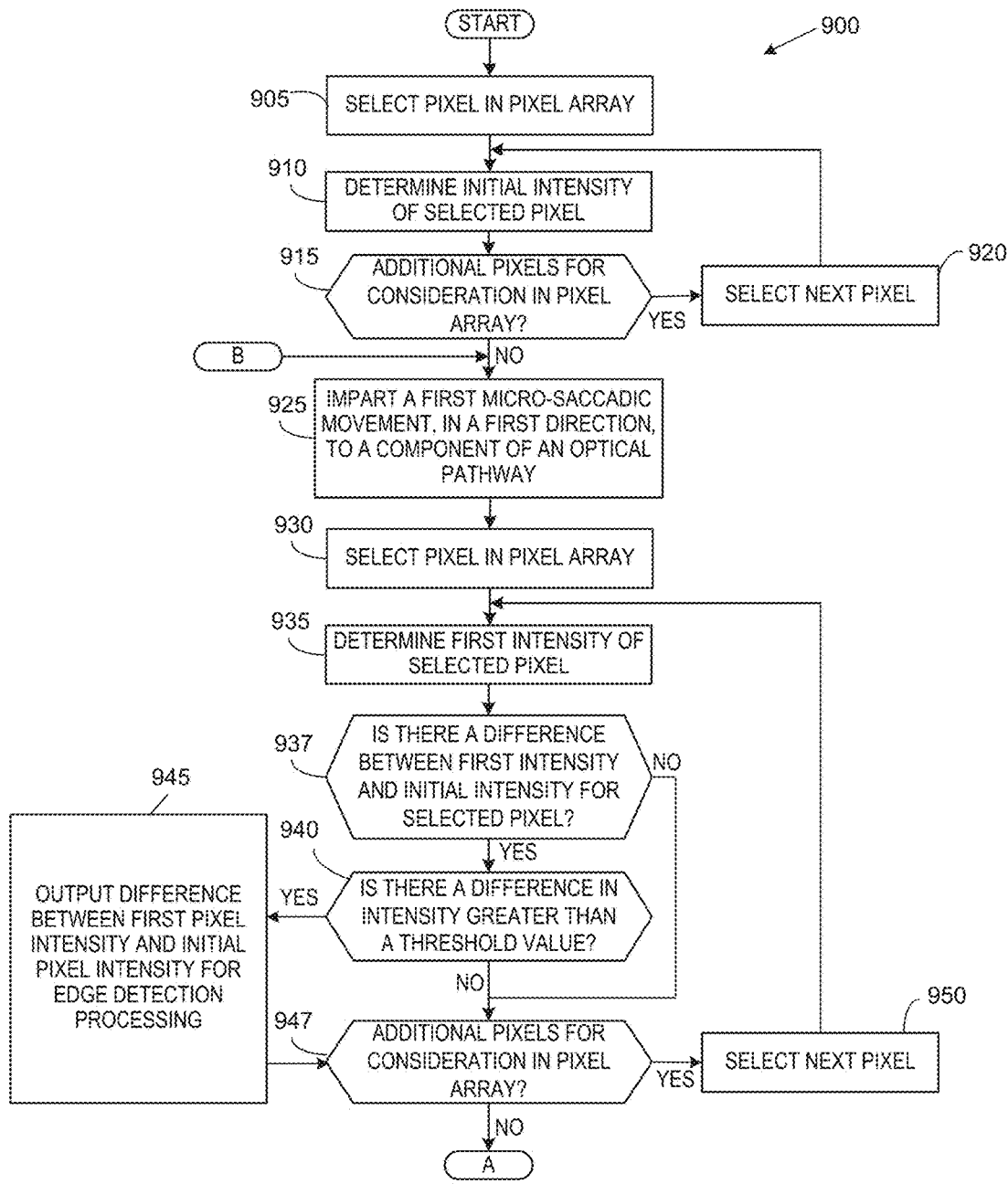
FIGS. 9A-9B present a flowchart representation of computer-executable instructions, which may be executed to implement the example event-based imaging devices of FIGS. 1A-1B and/or the example implementation of the optical pathway modulator of FIG. 2.
Figure 9B:
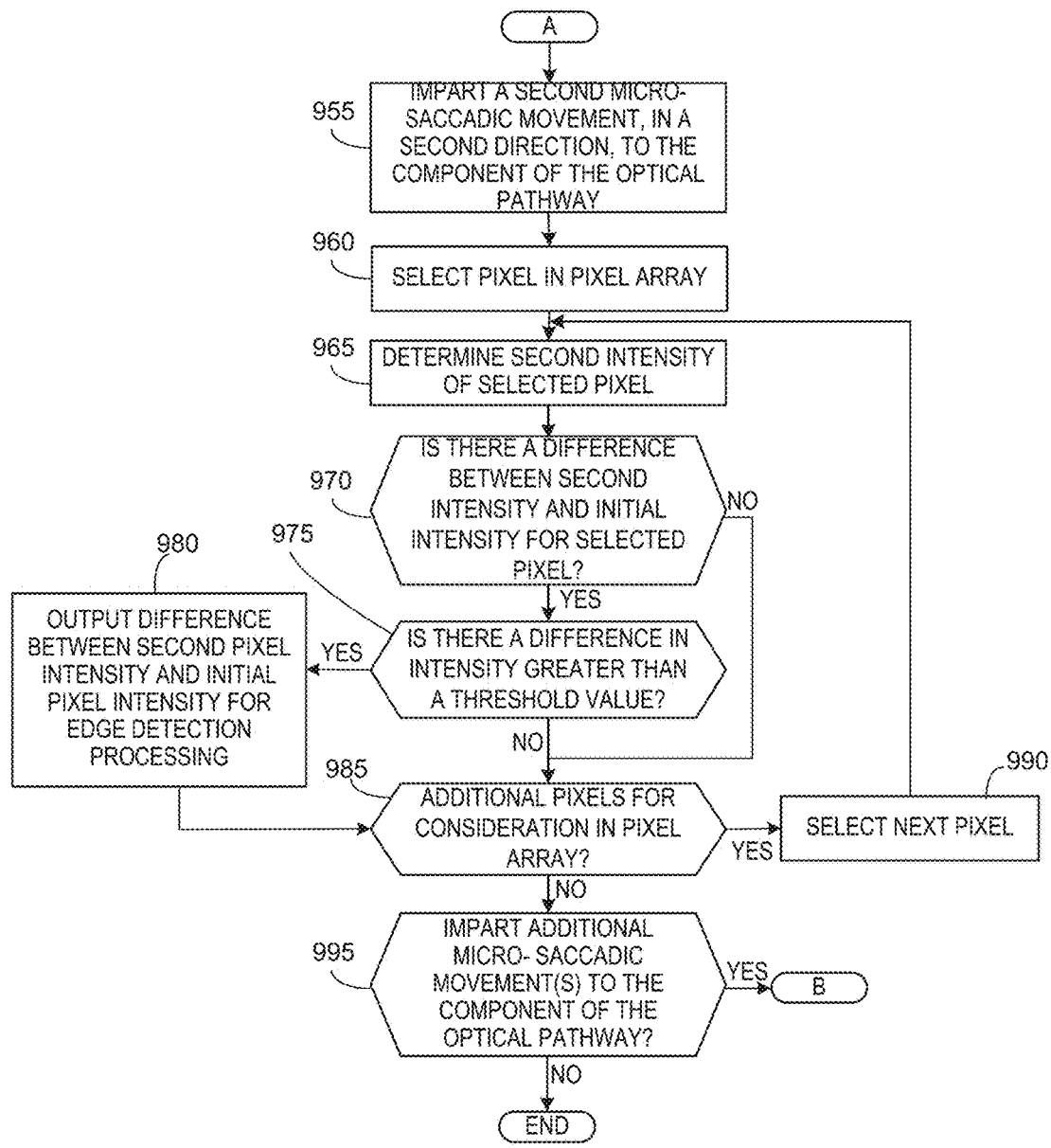

A flowchart representative of example machine readable instructions for implementing the first example event-based imaging device 100 with micro-saccadic actuators of FIG. 1A, the second example event-based imaging device 200 with micro-saccadic actuators of FIG. 1B and/or the example optical pathway modulator 106 of FIG. 2 is shown in FIGS. 9A-9B. In this example, the machine readable instructions comprise a program for execution by a processor such as the processor 1012 shown in the example processor platform 1000 discussed below in connection with FIG. 10. The program may be embodied in software stored on a non-transitory computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIGS. 9A-9B, many other methods of implementing the first example event-based imaging device 100 with micro-saccadic actuators of FIG. 1A, the second example event-based imaging device 200 with micro-saccadic actuators of FIG. 1B and/or the example optical pathway modulator 106 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 9A-9B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The example program 900 of FIGS. 9A-9B begins at block 905 with the example optical pathway modulator 106 selecting a pixel in the example pixel array 104. At block 910, the example optical pathway modulator 106 determines an initial intensity of the pixel selected in block 905. The example optical pathway modulator 106 then determines in block 915 if there are additional pixels in the example pixel array. If the outcome of block 915 is in the affirmative (block 915="YES"), then the example optical pathway modulator 106 selects a next pixel in the example pixel array 104 at block 920 and reverts back to block 910, where the example optical pathway modulator 106 determines an initial intensity of the pixel selected in block 920. The example optical pathway modulator 106 then determines in block 915 if there are any additional pixels in the example pixel array.

This process continues, for example, until the outcome of block 915 is negative (block 915="NO").

Following the determination of the initial intensity of the pixels in the example pixel array 104, at block 925 the example optical pathway modulator 106 imparts a first micro-saccadic movement, in a first direction (e.g., an X-direction), to one or more components of the example optical pathway 108 via a corresponding one of the example lens positioner 210, the example deflector positioner 220, and/or the example sensor positioner 230 (e.g., displacement of example lens 130 via the example lens positioner 210).

At block 930, following the first micro-saccadic movement, the example optical pathway modulator 106 selects a pixel in the example pixel array 104 and determines a first intensity of the selected pixel at block 935. At block 937, the example optical pathway modulator 106 determines if there is a difference in intensity between the first intensity and the initial intensity for the selected pixel. If the result of block 937 is "YES," control passes to block 940 where the example optical pathway modulator 106 determines if the difference in intensity is greater than a predetermined threshold value. If the result of block 940 is "YES," the example optical pathway modulator 106 outputs the difference between the first light intensity on the pixel and the initial light intensity on the pixel for the selected pixel at block 945 for edge detection processing, via the example communicator 240. In some examples, this output is asynchronous and is correlated to the time of the change in light intensity on the pixel.

Following the output of the difference between the first light intensity on the pixel and the initial light intensity on the pixel for the selected pixel at block 945, control passes to block 947. If the result of block 937 is "NO," or if the result of block 940 is "NO," control passes to block 947.

At block 947, the example optical pathway modulator 106 determines if there are additional pixels in the example pixel array 104. If the result at block 947 is "YES," control passes to block 950 and the example optical pathway modulator 106 selects a next pixel at block 950. Control then passes to block 935 where the example optical pathway modulator 106 determines a first intensity of the selected pixel for comparison to the corresponding initial intensity for the selected pixel at block 937.

When the example optical pathway modulator 106 determines at block 947 that there are no additional pixels in the example pixel array 104 (block 947="NO"), control passes to block 955 of FIG. 9B. At block 955, following the determination of the first intensity of the pixels in the example pixel array 104 and reporting or outputting of differences between the first light intensity on the pixel and the initial light intensity on the pixel for the selected pixels at block 945, the example optical pathway modulator 106 imparts a second micro-saccadic movement, in a second direction (e.g., a Y-direction), to the component(s) of the example optical pathway 108 via a corresponding one of the example lens positioner 210, the example deflector positioner 220, and/or the example sensor positioner 230 (e.g., displacement of example lens 130 via the example lens positioner 210).

At block 960, following the second micro-saccadic movement, the example optical pathway modulator 106 selects a pixel in the example pixel array 104 and determines a second intensity of the selected pixel at block 965. At block 970, the example optical pathway modulator 106 determines if there is a difference in intensity between the second intensity and the initial intensity for the selected pixel. If the result of block 970 is "YES," control passes to block 975 where the example optical pathway modulator 106 determines if the difference in intensity is greater than a predetermined threshold value.

If the result of block 975 is "YES," the example optical pathway modulator 106 outputs the difference between the second light intensity on the pixel and the initial light intensity on the pixel for the selected pixel for edge detection processing at block 980, via the example communicator 240. In some examples, this output is asynchronous and is correlated to the time of the change in light intensity on the pixel. If the result of block 975 is "NO," or if the result of block 970 is "NO," control passes to block 985.

At block 985, the example optical pathway modulator 106 determines if there are additional pixels in the example pixel array 104. If the result at block 985 is "YES," control passes to block 990 and the example optical pathway modulator 106 selects a next pixel at block 990. Control then passes to block 965 where the example optical pathway modulator 106 determines a second intensity of the selected pixel for comparison to the corresponding initial intensity for the selected pixel at block 970. When the example optical pathway modulator 106 determines at block 985 that there are no additional pixels in the example pixel array 104 (block 985="NO"), control passes to block 995. At block 995, the example optical pathway modulator 106 determines if additional micro-saccadic movements are to be applied to the component(s) of the example optical pathway 108 via a corresponding one of the example lens positioner 210, the example deflector positioner 220, and/or the example sensor positioner 230 (e.g., displacement of example lens 130 via the example lens positioner 210). If the result of block 995 is "YES," control passes to block 925 of FIG. 9A, where additional micro-saccadic movements are applied to the component(s) of the example optical pathway 108 via a corresponding one of the example lens positioner 210, the example deflector positioner 220, and/or the example sensor positioner 230. In some examples, the additional micro-saccadic movements may include micro-saccadic movements of a different magnitude than the first micro-saccadic movement (e.g., block 925) and the second micro-saccadic movement (block 955). In some examples, the example program 900 of FIGS. 9A-9B is iteratively run with a plurality of different magnitudes of the micro-saccadic movements to distinguish low frequency and high frequency features of a scene and/or to optimize a focus of the scene.

In some examples, one or more of the example blocks of the example program 900 of FIGS. 9A-9B are performed by the example sensor 102 (e.g., a dynamic vision sensor (DVS), etc.), the example optical pathway modulator 106, the example controller 145, and/or the example external system(s) 160.

Figure 10:
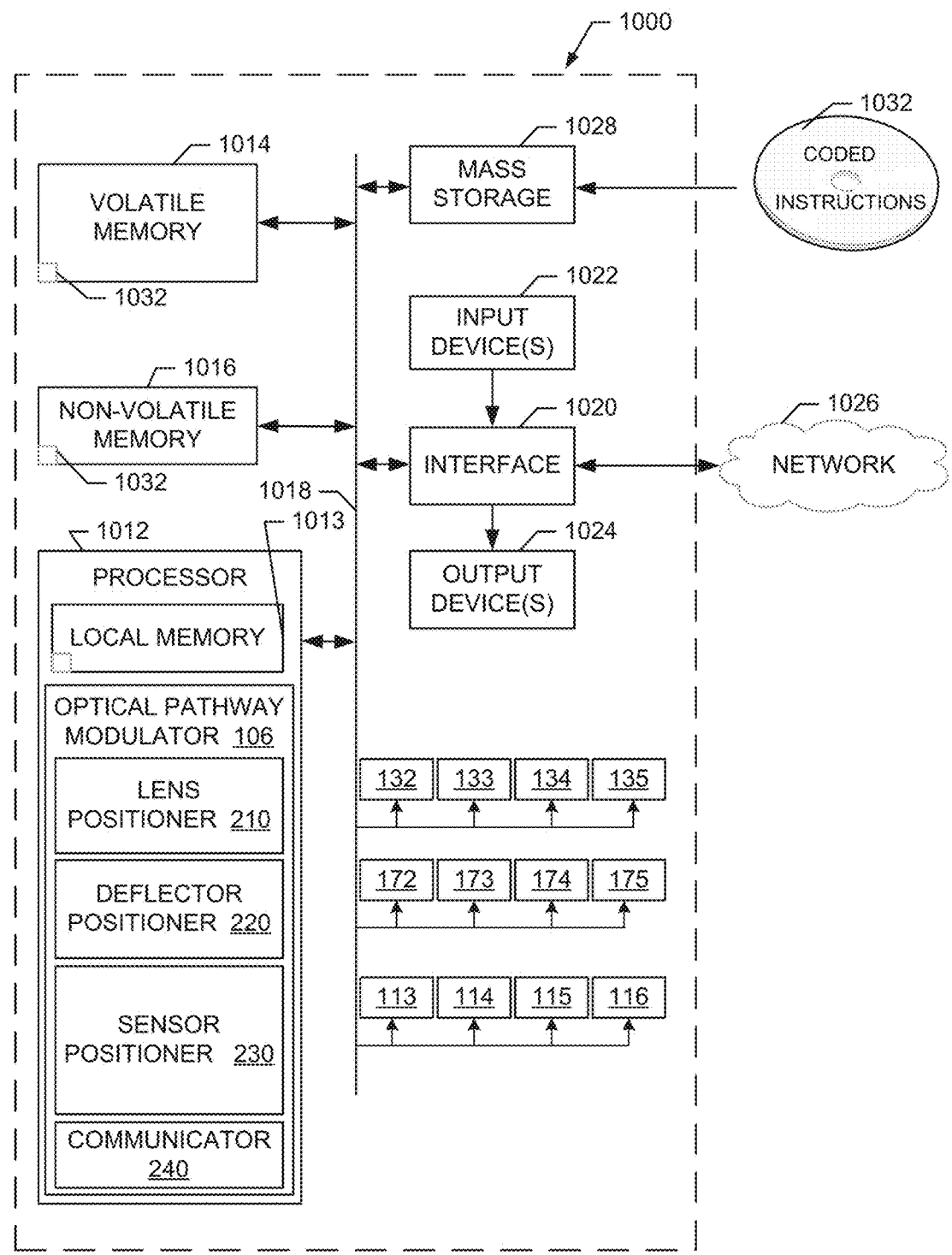
FIG. 10 is a block diagram illustrating an example processor platform which may execute the instructions of FIGS. 9A-9B to implement the example event-based imaging devices of FIGS. 1A-2 and/or the example implementation of the optical pathway modulator of FIG. 2.

FIG. 10 is a block diagram of an example processor platform 1000 capable of executing the instructions of FIGS. 9A-9B to implement the example optical pathway modulator 106 of FIGS. 1A-1B and/or FIG. 2. The processor platform 1000 can be, for example, a server, a personal computer, a mobile device (e.g., a cell phone, a smart phone, a tablet such as an iPad™), a personal digital assistant (PDA), an Internet appliance, a personal video recorder, a camera, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The hardware processor may be a semiconductor based (e.g., silicon based) device.

In this example, the processor implements the example lens positioner 210, the example deflector positioner 220, the example sensor positioner 230, the example communicator 240 and/or, more generally, the example optical pathway modulator 106 of FIG. 2.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 9A-9B may be stored in the mass storage device 1028, in the volatile memory 1014, in the non-volatile memory 1016, and/or on a removable tangible computer readable storage medium such as a CD or DVD.

From the foregoing, it will be appreciated that example methods, apparatus and articles of manufacture have been disclosed that requires significantly less power than conventional image devices since the image processing is temporally performed at the pixel level, exhibits a low latency, and aptly manages a high dynamic range. The disclosed example methods, apparatus and articles of manufacture further allow event cameras to sense image edges even in a static scene.

Example 1 is an event-based imaging device including an event-based sensor including a pixel array and an optical pathway modulator to move, via a micro-saccadic movement, one or more components of an optical pathway to shift incident light on the pixel array to cause a change in light intensity on the pixel in at least one pixel of the pixel array, wherein the optical pathway includes the event-based sensor.

Example 2 includes the event-based imaging device of example 1 and further includes, as a component of the optical pathway, a lens.

Example 3 includes the event-based imaging device as defined in any of Examples 1-2, wherein the event-based sensor includes a dynamic vision sensor.

Example 4 includes the event-based imaging device as defined in any of Examples 1-3, further including, as a component of the optical pathway, a deflector disposed in the optical pathway between the lens and the dynamic vision sensor.

Example 5 includes the event-based imaging device as defined in any of Examples 1-4, wherein the optical pathway modulator is to move the deflector via the micro-saccadic movement.

Example 6 includes the event-based imaging device as defined in any of Examples 1-5, wherein the optical pathway modulator is to move, via the micro-saccadic movement, any one or more of the lens, the dynamic vision sensor, or the deflector.

Example 7 includes the event-based imaging device as defined in any of Examples 1-6, wherein the optical pathway modulator is to cause a first actuator to implement a micro-saccadic movement of the lens along a first direction in a first plane.

Example 8 includes the event-based imaging device as defined in any of Examples 1-7, wherein the optical pathway modulator is to cause a third actuator to implement a micro-saccadic movement of the dynamic vision sensor along a first direction in a second plane.

Example 9 includes the event-based imaging device as defined in any of Examples 1-8, wherein the optical pathway modulator is to move the dynamic vision sensor via the micro-saccadic movement.

Example 10 includes the event-based imaging device as defined in any of Examples 1-9, wherein the dynamic vision sensor asynchronously outputs the change in light intensity on the pixel correlated to a time of the change in light intensity on the pixel.

Example 11 includes the event-based imaging device as defined in any of Examples 1-10, wherein the optical pathway modulator is to move the lens via the micro-saccadic movement.

Example 12 includes the event-based imaging device as defined in any of Examples 1-11, wherein the optical pathway modulator is to cause a second actuator to implement a micro-saccadic movement of the lens along a second direction in the first plane.

Example 13 includes the event-based imaging device as defined in any of Examples 1-12, wherein the first actuator and the second actuator include an electromagnet actuator or a piezoelectric actuator.

Example 14 includes the event-based imaging device as defined in any of Examples 1-13, wherein the first direction is different than the second direction.

Example 15 includes the event-based imaging device as defined in any of Examples 1-14, wherein the optical pathway modulator is to cause a fourth actuator to implement a micro-saccadic movement of the dynamic vision sensor along a second direction in the second plane.

Example 16 includes the event-based imaging device as defined in any of Examples 1-15, wherein the third actuator and the fourth actuator include an electromagnet actuator or a piezoelectric actuator.

Example 17 includes the event-based imaging device as defined in any of Examples 1-16, wherein the optical pathway modulator is to cause a fifth actuator to implement a micro-saccadic movement of the deflector along a first direction in a third plane.

Example 18 includes the event-based imaging device as defined in any of Examples 1-17, wherein the optical pathway modulator is to cause a sixth actuator to implement a micro-saccadic movement of the deflector along a second direction in the third plane.

Example 19 includes the event-based imaging device as defined in any of Examples 1-18, wherein the fifth actuator and the sixth actuator include an electromagnet actuator or a piezoelectric actuator.

Example 20 includes the event-based imaging device as defined in any of Examples 1-19, wherein the optical pathway modulator is to cause a first actuator to implement a micro-saccadic movement of the lens along a first direction, is to cause a second actuator to implement a micro-saccadic movement of the lens along a second direction, is to cause a third actuator to implement a micro-saccadic movement of the dynamic vision sensor along a third direction, and is to cause a fourth actuator to implement a micro-saccadic movement of the dynamic vision sensor along a fourth direction, wherein the first direction and the second direction are in a first plane, and wherein the first direction and the second direction are in a second plane.

Example 21 includes the event-based imaging device as defined in any of Examples 1-20, wherein the micro-saccadic movement includes a movement of a selected magnitude in one of a plurality of selected directions.

Example 22 includes the event-based imaging device as defined in any of Examples 1-21, wherein the micro-saccadic movement includes a plurality of movements, each of the plurality of movements having a selected magnitude in one of a plurality of selected directions.

Example 23 includes the event-based imaging device as defined in any of Examples 1-22, wherein one or more of the plurality of movements are in a randomly selected direction.

Example 24 includes the event-based imaging device as defined in any of Examples 1-23, wherein one or more of the plurality of movements are of a randomly selected magnitude.

Example 25 includes the event-based imaging device as defined in any of Examples 1-24, wherein the selected magnitude is between 1-100 pixels relative to the pixel array.

Example 26 includes the event-based imaging device as defined in any of Examples 1-25, wherein the micro-saccadic movement is less than about 5° from a center of the optical pathway.

Example 27 includes the event-based imaging device as defined in any of Examples 1-26, wherein the micro-saccadic movement is less than about 0.5° from a center of the optical pathway.

Example 28 includes the event-based imaging device as defined in any of Examples 1-27, wherein the micro-saccadic movement has a peak angular velocity below 1000°/s.

Example 29 includes the event-based imaging device as defined in any of Examples 1-28, wherein the deflector includes an optical beam steering device.

Example 30 includes the event-based imaging device as defined in any of Examples 1-29, wherein the optical beam steering device includes a mirror, a second lens, a prism, a rotating diffraction grating, or a liquid crystal device.

Example 31 includes the event-based imaging device as defined in any of Examples 1-30, wherein the optical beam steering device includes a microelectromechanical micro-mirror array.

Example 32 includes the event-based imaging device as defined in any of Examples 1-31, wherein the optical beam steering device includes a liquid crystal on silicon (LCoS) optical phased array (OPA) device.

Example 33 is an edge detection method including moving a component of an optical pathway in a first direction via a first micro-saccadic movement to displace incident light on a dynamic vision sensor pixel array in the optical pathway, sensing a change in light intensity on the pixel, via the dynamic vision sensor pixel array, responsive to the first micro-saccadic movement of the component of the optical pathway in the first direction; and outputting the change in light intensity on the pixel in correlation with a time of occurrence of the change in light intensity on the pixel.

Example 34 includes the edge detection method as defined in Example 33, wherein the moving of the component of the optical pathway includes moving at least one of a lens, the dynamic vision sensor pixel array, or a deflector disposed between the lens and the dynamic vision sensor pixel array.

Example 35 includes the edge detection method as defined in any of Examples 33-34, further including moving the component of the optical pathway in a second direction via a second micro-saccadic movement to displace incident light on a dynamic vision sensor pixel array in the optical pathway, sensing a change in light intensity on the pixel, via the dynamic vision sensor pixel array, responsive to the second micro-saccadic movement of the component in the second direction and outputting the change in light intensity on the pixel in correlation with a time of occurrence of the change in light intensity on the pixel.

Example 36 includes the edge detection method as defined in any of Examples 33-35, wherein the first micro-saccadic movement in the first direction is substantially perpendicular to the second micro-saccadic movement in the second direction.

Example 37 includes the edge detection method as defined in any of Examples 33-36, wherein the first direction and the second direction are in a plane substantially perpendicular to the optical pathway.

Example 38 includes the edge detection method as defined in any of Examples 33-37, wherein the moving of the component of the optical pathway in the first direction via the first micro-saccadic movement includes is of a first magnitude selected from a range of available magnitudes, and wherein the moving of the component of the optical pathway in the second direction via the second micro-saccadic movement is of a second magnitude selected from the range of available magnitudes.

Example 39 includes the edge detection method as defined in any of Examples 33-38, wherein the moving of the component of the optical pathway in the first direction via the first micro-saccadic movement includes is of a first magnitude randomly selected from a range of available magnitudes, and wherein the moving of the component of the optical pathway in the second direction via the second micro-saccadic movement is of a second magnitude randomly selected from the range of available magnitudes.

Example 40 includes the edge detection method as defined in any of Examples 33-39, and further includes using the first change in light intensity on the pixel to determine edges along the second direction and using the second change in light intensity on the pixel to determine edges along the first direction.

Example 41 includes the edge detection method as defined in any of Examples 33-40, wherein the range of available magnitudes includes a range of between 1-100 pixels relative to the dynamic vision sensor pixel array.

Example 42 includes the edge detection method as defined in any of Examples 33-41, wherein the range of available magnitudes includes a range of between less than about 5° from a center of the optical pathway.

Example 43 is an edge detection method including determining an initial light intensity on the pixel for a pixel in a sensor pixel array disposed in an optical pathway, imparting a first micro-saccadic movement, in a first direction, to a component of an optical pathway, and determining, for the pixel in the sensor pixel array, a first change in light intensity on the pixel relative to the initial light intensity on the pixel responsive to the first micro-saccadic movement. The method also includes outputting the first change in light intensity on the pixel for the pixel responsive to the first micro-saccadic movement, the first change in light intensity on the pixel being correlated to a time of occurrence of the first change in light intensity on the pixel and imparting a second micro-saccadic movement, in a second direction, to the component of the optical pathway. The method further include determining, for the pixel, a second change in light intensity on the pixel responsive to the second micro-saccadic movement and outputting the second change in light intensity on the pixel for the pixel responsive to the second micro-saccadic movement, the second change in light intensity on the pixel being correlated to a time of occurrence of the second change in light intensity on the pixel.

Example 44 includes the edge detection method as defined in Example 43, wherein the imparting of the first micro-saccadic movement or the imparting of the second micro-saccadic movement is to the sensor pixel array, to a lens or to a deflector disposed between the lens and the sensor pixel array.

Example 45 includes the edge detection method as defined in any of Examples 43-44, further including using the first change in light intensity on the pixel to determine edges along the second direction and using the second change in light intensity on the pixel to determine edges along the first direction.

Example 46 is a non-transitory machine readable medium comprising executable instructions that, when executed, cause at least one processor to at least move a component of an optical pathway in a first direction via a first micro-saccadic movement to displace incident light on a dynamic vision sensor pixel array in the optical pathway, to sense a first change in light intensity on the pixel, via the dynamic vision sensor pixel array, responsive to the first micro-saccadic movement of the component of the optical pathway in the first direction and output the first change in light intensity on the pixel in correlation with a time of occurrence of the first change in light intensity on the pixel.

Example 47 includes the non-transitory machine readable medium as defined in Example 46, comprising executable instructions that, when executed, cause the at least one processor to move the component of the optical pathway in a second direction via a second micro-saccadic movement to displace incident light on a sensor pixel array in the optical pathway, to sense a second change in light intensity on the pixel, via the sensor pixel array, responsive to the second micro-saccadic movement of the component in the second direction and to output the second change in light intensity on the pixel in correlation with a time of occurrence of the second change in light intensity on the pixel.

Example 48 is a machine-readable storage including machine-readable instructions, when executed, to implement a method or realize an apparatus as recited in any preceding Example.

Example 49 is an event-based imaging device including a lens, a sensing means having a pixel array, and a means for moving, via a micro-saccadic movement, one or more components of an optical pathway including the lens and the pixel array to shift an incident light on the pixel array and to cause a change in light intensity on the pixel in at least pixel in the pixel array. The event-based imaging device also includes a timing means to correlate the change in light intensity on the pixel to a time of occurrence of the change in light intensity on the pixel and an output means for transmitting the change in light intensity on the pixel and the time of occurrence of the change in light intensity on the pixel.

Example 50 includes the event-based imaging device as defined in Example 49, wherein the optical pathway includes the lens, the sensing means, and a deflector.

Example 51 includes the event-based imaging device as defined in any of Examples 48-49, wherein the means for moving the one or more components of the optical pathway includes an optical pathway modulator.

Example 52 includes the event-based imaging device as defined in any of Examples 48-51, wherein the optical pathway modulator is to cause a first actuator to implement a micro-saccadic movement of the lens along a first direction in a plane and a second actuator to implement a micro-saccadic movement of the lens along a second direction in the plane.

Example 53 includes the event-based imaging device as defined in any of Examples 48-52, wherein the first actuator and the second actuator include an electromagnet actuator or a piezoelectric actuator.

Example 54 includes the event-based imaging device as defined in any of Examples 48-53, wherein the micro-saccadic movement includes a first movement of a first selected magnitude along a first direction and a second movement of a second selected magnitude along a second direction.

Example 55 includes the event-based imaging device as defined in any of Examples 48-54, wherein the micro-saccadic movement is between 1-100 pixels relative to the pixel array.

Example 56 includes the event-based imaging device as defined in any of Examples 48-55, the micro-saccadic movement is between 0-5° from a center of the optical pathway.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An imaging device, comprising:
a dynamic vision sensor including a pixel array; and
an optical pathway modulator to move, via a micro-saccadic movement, one or more components of an optical pathway to shift incident light on the pixel array to cause a change in light intensity on at least one pixel of the pixel array, the optical pathway including the sensor and a lens, the micro-saccadic movement including a plurality of movements, each of the plurality of movements having a selected magnitude in one of a plurality of selected directions.

2. The imaging device of claim 1, further including a deflector disposed in the optical pathway between the lens and the dynamic vision sensor.

3. The imaging device of claim 2, wherein the optical pathway modulator is to move the deflector via the micro-saccadic movement.

4. The imaging device of claim 2, wherein the optical pathway modulator is to move, via the micro-saccadic movement, any one or more of the lens, the dynamic vision sensor, or the deflector.

5. The imaging device of claim 1, wherein the optical pathway modulator is to move the dynamic vision sensor via the micro-saccadic movement.

6. The imaging device of claim 1, wherein the dynamic vision sensor asynchronously outputs the change in light intensity correlated to a time of the change in light intensity.

7. The imaging device of claim 1, wherein the optical pathway modulator is to move the lens via the micro-saccadic movement.

8. The imaging device of claim 1, wherein the micro-saccadic movement includes a movement of a selected magnitude in one of a plurality of selected directions.

9. The imaging device of claim 1, wherein the selected magnitude is between 1-100 pixels relative to the pixel array.

10. An imaging device, comprising:
    an optical pathway including a dynamic vision sensor, a lens, and a deflector between the lens and the dynamic vision sensor, the dynamic vision sensor including a pixel array; and
    an optical pathway modulator to move, via a micro-saccadic movement, one or more components of the optical pathway to shift light to cause a change in light intensity on at least one pixel of the pixel array, the optical pathway modulator to cause a first actuator to implement a micro-saccadic movement of the lens along a first direction, to cause a second actuator to implement a micro-saccadic movement of the lens along a second direction, to cause a third actuator to implement a micro-saccadic movement of the dynamic vision sensor along a third direction, and to cause a fourth actuator to implement a micro-saccadic movement of the dynamic vision sensor along a fourth direction, wherein the first direction and the second direction are in a first plane, and wherein the third direction and the fourth direction are in a second plane.

11. An edge detection method, comprising:
    moving a lens of an optical pathway in a first direction via a first micro-saccadic movement;
    moving the lens in a second direction via a second micro-saccadic movement;
    moving at least one of a dynamic vision sensor or a deflector in a third direction via a third micro-saccadic movement;
    moving the at least one of a dynamic vision sensor or the deflector in a fourth direction via a fourth micro-saccadic movement;
    sensing changes in light intensity on a pixel array of the dynamic vision sensor responsive to the micro-saccadic movements; and
    outputting the changes in light intensity and times of occurrence of the changes in light intensity.

12. The edge detection method of claim 11, further including:
    using the changes in light intensity to determine edges.

* * * * *